United States Patent
Bakan et al.

(10) Patent No.: US 12,497,482 B2
(45) Date of Patent: Dec. 16, 2025

(54) METHOD FOR PREPARING AN ELASTOMER FROM A HYDROXYLATED FATTY ACID AND ELASTOMER OBTAINED BY SUCH A METHOD

(71) Applicants: INSTITUT NATIONAL DE RECHERCHE POUR L'AGRICULTURE, L'ALIMENTATION ET L'ENVIRONNEMENT, Paris (GA); INSTITUT NATIONAL POLYTECHNIQUE DE TOULOUSE, Toulouse (FR); CENTRE NATIONAL DE LA RECHERCHE SCIENTIFIQUE, Paris (FR); NANTES UNIVERSITÉ, Nantes (FR); ECOLE NATIONALE VETERINAIRE, AGROALIMENTAIRE ET DE L'ALIMENTATION, Nantes (FR)

(72) Inventors: Bénédicte Bakan, Nantes (FR); Didier Marion, Nantes (FR); Denis Lourdin, Sucésur Erdre (FR); Mathilde Marc, Nantes (FR); Romain Valentin, Toulouse (FR); Zéphirin Mouloungui, Toulouse (FR); Eric Leroy, Saint Etienne de Montluc (FR); Christelle Lopez, Pacé (FR)

(73) Assignees: CENTRE NATIONAL DE LA RECHERCHE SCIENTIFIQUE, Paris (FR); NANTES UNIVERSITÉ, Nantes (FR); ECOLE NATIONALE VETERINAIRE, AGROALIMENTAIRE ET DE L'ALIMENTATION, Nantes (FR); INSTITUT NATIONAL DE RECHERCHE POUR L'AGRICULTURE, L'ALIMENTATION ET L'ENVIRONNEMENT, Paris (FR); INSTITUT NATIONAL POLYTECHNIQUE DE TOULOUSE, Toulouse (FR)

( * ) Notice: Subject to any disclaimer, the term of this patent is extended or adjusted under 35 U.S.C. 154(b) by 851 days.

(21) Appl. No.: 17/622,509
(22) PCT Filed: Jun. 23, 2020
(86) PCT No.: PCT/EP2020/067548
§ 371 (c)(1),
(2) Date: Dec. 23, 2021
(87) PCT Pub. No.: WO2020/260312
PCT Pub. Date: Dec. 30, 2020

(65) Prior Publication Data
US 2022/0251289 A1    Aug. 11, 2022

(30) Foreign Application Priority Data
Jun. 25, 2019   (FR) .................................. 1906915

(51) Int. Cl.
*C08G 63/06* (2006.01)
(52) U.S. Cl.
CPC .................................. *C08G 63/06* (2013.01)
(58) Field of Classification Search
None
See application file for complete search history.

(56) References Cited

FOREIGN PATENT DOCUMENTS

| WO | 2011/144792 | 11/2011 |
|---|---|---|
| WO | 2015/028299 | 3/2015 |
| WO | 2017/147708 | 9/2017 |

OTHER PUBLICATIONS

Machine translation of WO 2011144792A1 (Year: NA).*
(Continued)

*Primary Examiner* — Rachel Kahn
(74) *Attorney, Agent, or Firm* — NIXON & VANDERHYE

(57) ABSTRACT

A method for preparing a polymer of the elastomer type based on a monomer selected from polyhydroxylated fatty acids and esters of a polyhydroxylated fatty acid and a C1-C18 aliphatic chain alcohol is disclosed. This method
(Continued)

includes preparing a reaction medium by bringing the monomer with a polyol, this reaction medium being catalyst free, then a step of heating the reaction medium in order to implement the copolymerisation of the monomer and of the polyol and the cross-linking of the polymer thus formed, with at least the initial phase of this heating step being implemented at a reduced pressure.

10 Claims, 11 Drawing Sheets

(56) References Cited

OTHER PUBLICATIONS

Zaikov et al (Technical Hints on Polycondensation; Chapter 5 of Compositional Analysis of Polymers: An Engineering Approach, 2016, p. 124-153, Canada: Apple Academic Press) (Year: 2016).*

Benítez et al., "Plant Biopolyester Cutin: A Tough Way to Its Chemical Synthesis", Biochimica et Biophysica Acta 1674, pp. 1-3 (2004).

Philippe et al., "Ester Cross-Link Profiling of the Cutin Polymer of Wild-Type and Cutin Synthase Tomato Mutants Highlights Different Mechanisms of Polymerization", Plant Physiology, vol. 170, pp. 807-820 (2016).

English Translation of International Search Report for PCT/EP2020/067548, dated Jul. 31, 2020, 2 pages.

French International Search Report and Written Opinion of the ISA for PCT/EP2020/067548, dated Jul. 31, 2020, 15 pages.

Benitez et al., "Valorization of Tomato Processing by-Products: Fatty Acid Extraction and Production of Bio-Based Materials", Materials, vol. 11, No. 11, Nov. 7, 2018, pp. 1-13.

\* cited by examiner

A/

B/

METHOD FOR PREPARING AN ELASTOMER FROM A HYDROXYLATED FATTY ACID AND ELASTOMER OBTAINED BY SUCH A METHOD

CROSS REFERENCE TO RELATED APPLICATIONS

The present application is a National Phase of International Application Number PCT/EP2020/067548 filed Jun. 23, 2020, which designated the U.S. and claims priority benefits from French Application Number FR 1906915 filed Jun. 25, 2019, the entire contents of each of which are hereby incorporated by reference.

The present invention lies in the field of polymers, and more particularly of elastomers, i.e. polymers featuring with rubber elastic properties.

More particularly, the present invention relates to a method for preparing a polymer based on a polyhydroxylated fatty acid or on an ester of such a fatty acid, as well as a polymer obtainable by such a method.

A ω-hydroxylated fatty acid is defined as a fatty acid containing at least one hydroxyl group OH at the position ω, i.e. carried by the last carbon atom of the chain of the fatty acid, the first carbon atom of the chain being the carbon atom of the carboxyl group of the molecule. By convention, by the expression ω-hydroxylated fatty acid, reference is made generally, and in the present description, to a fatty acid including a single hydroxyl group, located at the position ω. Furthermore, the term "polyhydroxylated fatty acid" denotes, also in a conventional manner, a fatty acid comprising a plurality of hydroxyl groups, at least one of which is located at the position ω. Thus, a dihydroxylated fatty acid comprises two hydroxyl groups, at least one of which is located at the position ω, a trihydroxylated fatty acid comprises three hydroxyl groups, at least one of which is located at the w position, and so on.

Polymers with rubber properties, or elastomers, find application in many fields, in particular in the fields of electronics, composite materials, the protection of parts against corrosion, etc., in which their elastic properties are profitably used for the manufacture of various products, for applications in sectors as various as the automotive sector, the aeronautical sector, the medical sector, etc.

Moreover, the valorization of agro-resources is currently one of the challenges of green chemistry research. An important goal of the chemical industry is to implement renewable, biodegradable and non-toxic raw materials for the preparation of various substances and products, and in particular for the preparation of polymer materials.

The present invention falls in line with this objective. More particularly, the present inventors have taken interest in the compounds of plant origin which are fatty acids of the ω-hydroxylated and polyhydroxylated type. These fatty acids, with a long carbon chain, can be extracted from plants, in particular from the cuticles of fruits and vegetables, and more particularly from the cutin entering into the composition of these cuticles. Although present in large amounts in nature, they are currently little valued.

The present invention aims to provide a solution for exploiting such hydroxylated fatty acids, in the particular context of the preparation of polymers with elastic deformation capacity.

Such a solution, in order to form a biopolyester, has been proposed by the prior art, illustrated in particular by the publication by Benitez et al., in Biochimica and Biophysica Acta, 2004, 1674: 1-3. This document describes a method for preparing a biopolyester identical to natural cutin, from monomers extracted from tomato cutin, by a polycondensation reaction in the presence of a catalyst, dodecylbenzenesulfonic acid, in toluene. More recently, the publication of Benitez et al., In Materials, 2018, 11, 2211, has proposed a similar method in which the polycondensation reaction is carried out in the absence of a catalyst.

The document WO 2017/147708 describes a method for preparing a polymer from ω-hydroxylated fatty acid and 2-butyl-2-ethyl-1,3-propanediol, implementing a catalyst.

It has now been discovered by the inventors that it is possible to manufacture, from polyhydroxylated fatty acids or their esters, polymers featuring rubber-like elastic properties, the properties of which, in particular elasticity properties and thermomechanical properties, can be accurately and easily controlled, without implementing a catalyst, through an adequate selection of reagents and of the operating mode implemented.

Thus, the present invention aims to provide a method for preparing, from a polyhydroxylated fatty acid or from an ester of a polyhydroxylated fatty acid, an elastomer whose rubber properties can be modulated in a controlled manner.

Additional objectives of the invention are that this method is easy to implement, that it does not use any product that is toxic to humans and animals and/or harmful to the environment, and that it allows forming a recyclable elastomer, furthermore at a low cost.

Thus, according to a first aspect, the present invention provides a method for preparing a polymer of polyester type, more particularly an elastomer in the form of a three-dimensional thermoset network, based on at least one polyhydroxylated fatty acid. This method comprises the following successive steps:

the preparation of a reaction medium, by mixing/bringing together:
  a monomer selected from polyhydroxylated fatty acids and esters of a polyhydroxylated fatty acid and of an alcohol with a linear or branched, saturated or unsaturated, optionally substituted, aliphatic chain, said aliphatic chain including from 1 to 18 carbon atoms; or a mixture of hydroxylated fatty acids and/or esters of a hydroxylated fatty acid and of an alcohol with a linear or branched, saturated or unsaturated, optionally substituted, aliphatic chain, said aliphatic chain including from 1 to 18 carbon atoms, said mixture containing at least 20% by weight of said monomer with respect to the total weight of said mixture of hydroxylated fatty acids and/or esters,
  with a polyol different from said monomer and where appropriate different from said hydroxylated fatty acids and/or said esters of said mixture (esters of a hydroxylated fatty acid and of an alcohol with a linear or branched, saturated or unsaturated, optionally substituted, aliphatic chain, said aliphatic chain including from 1 to 18 carbon atoms),
  this reaction medium being free of catalyst,
and a step of heating the reaction medium to carry out the copolymerisation of the monomer and of the polyol and the crosslinking of the polymer thus formed.

At least an initial phase of this heating step is carried out under reduced pressure. By this, it should be understood that a reduced pressure is applied at least at the beginning of the heating step, in the early stages of this step.

The polymer formed by such a method, from said monomer consisting of a polyhydroxylated fatty acid or an ester of such a fatty acid, advantageously involves not only linear/primary ester bonds involving the hydroxyl groups at the position w of the monomer, but also secondary ester bonds involving the other hydroxyl groups, contained in the carbon chain, of the monomer. This results in a crosslinking pattern with multiple branches in the structure of the obtained polymer, which is modulable, which allows controlling the properties of the polymer, and which is much more advantageous than that obtained with the ω-hydroxylated fatty acids, having a single hydroxyl function, proposed by the prior art.

Preferably, all of these steps are carried out in a single container, preferably in a mould having a shape suited for the intended application of the polymer obtained upon completion of the method. Preferably, all the phases of the heating step are furthermore carried out by means of the same heating device.

The heating device in which the method according to the invention is implemented is conventional as such. In particular, it consists of a furnace, which could have one or several temperature area(s), equipped with means for establishing a reduced pressure therein, as well as, preferably, means for stirring a container/mould placed thereinside.

Besides being free of catalyst, i.e. of reaction promoter/accelerator, the reaction medium is furthermore preferably devoid of solvent, and preferably also devoid of chain blocker.

Advantageously, the heating step of the method according to the invention is implemented under conditions allowing realizing the esterification of one or more of the hydroxyl groups of the polyol by the acid function of the monomer, so as to enable the crosslinking of a polymer to form a thermoset three-dimensional network. An elastomer is then obtained in the solid form. It is within the skills of a person skilled in the art to determine the time and temperature conditions to be applied in order to obtain such a three-dimensional thermoset network, depending on the particular monomer and polyol used and the crosslinking degree desired for the elastomer. Advantageously, the elastic and thermomechanical properties of this elastomer can be modulated as a function of the initial content of polyol in the reaction medium.

Furthermore, the application of reduced pressure during at least the initial phase of the heating step ensures the elimination of the water produced during the polymerisation reaction, as it is formed, which advantageously allows shifting the thermodynamic equilibrium of this reaction towards the formation of an ester and increasing the reaction kinetics. It has also been noticed by the present inventors that, surprisingly, the level of pressure applied during the initial phase of the heating step affects the number and the nature of hydroxyl functions of the monomer and of the polyol that are esterified during the reaction, and consequently the rubber elastic properties of the elastomer formed upon completion of the method according to the invention. By setting the pressure applied during the initial phase of the heating step, it is thus possible to modulate these properties in a controlled manner.

In preferred embodiments of the invention, at least the initial phase of the heating step is carried out at a pressure comprised between 0 and 900 mbar.

Preferably, the pressure applied during at least the initial phase of the heating step is comprised between 400 and 800 mbar. It has been discovered by the present inventors that, surprisingly, the thermomechanical properties, in particular the storage modulus (elastic response of the material in dynamic mechanical analysis (DMA)) and the apparent crosslinking density, of the polymers obtained by application of a pressure in this range of values, are particularly stable. Such a feature thus allows for a very good control of the structure and of the mesh size of the polymer, as well as of its degree of crystallinity, by enabling in particular the control of the content of esterified polyol within the polymer. The application of a pressure in the range of 400 to 800 mbar during the initial phase of the heating step allows not only increasing the rate of the polymerisation reaction, but also minimising the amount of uncrosslinked polyol.

Preferably, the duration of the initial phase of the heating step substantially corresponds to the time necessary, under the operating conditions implemented, to reach the gel point of the polymer which is forming in the reaction medium. In particular, this duration depends on the heating temperature and on the concentration of polyol in the reaction medium, for a given concentration of the monomer.

In a manner conventional as such, as for any process leading to the formation of a chemically crosslinked polymer network, the gel point is herein defined as the moment when a solid three-dimensional network appears in the liquid reaction medium. The gel time corresponds to the time interval between the beginning of the reaction and the moment when the gel point is reached in the reaction medium. The apparition of this solid network causes a divergence in the flow viscosity, which tends to infinity at gel time. Moreover, this solid network is by nature insoluble in solvents. Hence, it is possible to detect its apparition, i.e. the occurrence of the gel point, by a solubility test in a solvent capable of dissolving the components of the initial reaction medium.

It is within the skills of a person skilled in the art to determine, for each set of specific operating conditions of the method for preparing a polymer according to the invention, the gel time necessary to reach this gel point. To this end, a person skilled in the art may in particular proceed empirically, for example by solubilisation tests of the reaction medium after different reaction times, in a solvent capable of dissolving the initial reaction medium. The gel time will then be comprised between the shortest reaction time leading to the observation of a fraction insoluble in the solvent used for the solubility test, and the longest reaction time for which the reaction medium remains completely soluble in the presence of this solvent. As an example, after different reaction times, a sample of 10 mg of reaction medium may thus be incorporated into 1 ml of solvent, for example of ethanol. After 5 minutes of vortexing, the possible apparition of an insoluble fraction in the mixture is observed, which demonstrates the fact that the gel point has been reached, and the gel time exceeded. Such a solubility test may be carried out at very close intervals, for example every 10 seconds, in order to determine the gel time as accurately as possible. This solubility test may be carried out on a control reaction medium, in particular of a small volume, in order to determine the gel time of the polymer under the operating conditions that will subsequently be applied for the implementation of the method according to the invention itself.

Preferably, the duration of the initial phase is comprised between 30 min and 5 hours, preferably comprised between 1 hour and 3 hours.

The method according to the invention may equally implement a single monomer selected from polyhydroxylated fatty acids and esters of a polyhydroxylated fatty acid and of an alcohol with a linear or branched, saturated or unsaturated, optionally substituted, aliphatic chain, including from 1 to 18 carbon atoms, or a plurality of such monomers.

Moreover, in the present description, the term "polyol" refers to both a single polyol and a mixture of polyols.

Preferably, the reaction medium contains less than 10% by weight of component(s) other than the polyol and the monomer(s) selected from polyhydroxylated fatty acids and esters of a polyhydroxylated fatty acid and of an alcohol with a linear or branched, saturated or unsaturated, optionally substituted, aliphatic chain including from 1 to 18 carbon atoms. Thus, the mixing of the polyol and of the monomer(s) preferably represents at least 90% by weight of the reaction medium.

The method according to the invention may further meet one or more of the features described hereinafter, implemented separately or in any of their technically feasible combinations.

The implemented polyol may contain one or several acid function(s), or it may not contain any acid function. Preferably, it is not a hydroxylated fatty acid, and in particular not a polyhydroxylated fatty acid or a ω-hydroxylated fatty acid.

In particularly preferred embodiments of the invention, the polyol is a triol or comprises a triol. Preferably, it consists of glycerol, which can be used alone or in a mixture with one or several other polyols, in particular one or several other triols.

In particular, glycerol has the advantages of a bio-based origin and an absence of toxicity for living beings. Furthermore, glycerol is the main waste from the production of biofuel, so that the method according to the invention can then be part of the recovery of waste from agriculture and industry.

In particular embodiments of the invention, the reaction medium contains a concentration comprised between 1 to 25% by weight of polyol, with respect to the total weight of the reaction medium. Advantageously, such a concentration range allows obtaining, with good reaction kinetics, in a time that does not exceed about 50 hours, a polymer featuring rubber elasticity properties, the degree of which can be modulated as a function of the exact concentration of polyol in the reaction medium, thereby allowing finely adapting these properties in the most suitable manner possible for the intended application.

In this concentration range, more than 85% by weight, and even in most configurations more than 90% by weight, of the polyol present in the polymer is involved in the crosslinking network of the formed polymer. This should be understood to mean that more than 85% by weight, and most often more than 90% by weight, of the polyol present in the polymer is involved in an ester bond, via at least one of its hydroxyl functions, within the polymer. The other polyol molecules, not involved in covalent bonds within the polymer, have a role of a plasticiser for the latter.

In particular embodiments of the invention, the reaction medium contains 15 to 25% by weight of the polyol, with respect to the total weight of the reaction medium. It has been discovered by the present inventors that, surprisingly, such a concentration range of the polyol allows forming a polymer having crystalline zones, the crystalline state of the polymer being ever higher as the initial polyol concentration itself is high. The presence of such crystalline zones makes the polymer formed by the method according to the invention particularly interesting for many applications.

Furthermore, quite advantageously, the storage modulus (elastic response in dynamic mechanical analysis (DMA)) of the polymers formed by the method according to the invention, measured at 50° C., barely varies in the range from 15 to 25% by weight of polyol. This storage modulus then corresponds to the modulus of elasticity at low deformation of the materials. At a temperature of 50° C., the materials behave like rubber with a modulus of elasticity in the range of megapascals.

The application of Flory's theory on rubber elasticity then allows estimating the apparent crosslinking density of the elastomer network, which is proportional to the modulus of elasticity, and which is therefore also advantageously almost constant in the range from 15 to 25% by weight of polyol in the initial reaction medium.

The polyhydroxylated fatty acid implemented in the method according to the invention may be linear or branched, i.e. consist in a carboxylic acid with a linear or branched aliphatic chain carrying several hydroxyl functions, at least one of which is located at the end position of said chain. The polyhydroxylated fatty acid implemented according to the invention may in particular correspond to the general formula (I):

$$(HO)C_nH_{2n-m-2p}(OH)_mCOOH \quad (I)$$

wherein:
n is an integer comprised between 7 and 21, preferably between 12 and 20, more preferably between 13 and 19, preferentially between 15 and 17,
m is an integer greater than 0, preferably comprised between 1 and 3, and preferentially equal to 1,
p represents the number of unsaturations contained in said fatty acid and is an integer comprised between 0 and 3, preferably equal to 0.

In particular, the polyhydroxylated fatty acid esters that may be implemented according to the invention may correspond to the general formula (II):

$$(HO)C_nH_{2n-m-2p}(OH)_mCOOR \quad (II)$$

wherein:
n, m and p are as defined before,
and R represents a linear or branched, saturated or unsaturated, optionally substituted, aliphatic chain including from 1 to 18 carbon atoms, preferably from 1 to 6 carbon atoms, preferentially a methyl radical or an ethyl radical.

In the present description, by "aliphatic chain", it should be understood a non-aromatic open carbon chain.

Preferably, the monomer is a methyl or ethyl ester of a polyhydroxylated fatty acid.

Preferred features of the polyhydroxylated fatty acids that can be implemented in the method according to the invention are disclosed in detail hereinafter. The same features can be transposed identically to esters of a polyhydroxylated fatty acid and of an alcohol with a linear or branched, saturated or unsaturated, optionally substituted, aliphatic chain, including from 1 to 18 carbon atoms.

Preferably, a polyhydroxylated fatty acid implemented as a monomer in the method according to the invention is a dihydroxylated fatty acid, i.e. whose carbon chain carries two hydroxyl groups, one of which is located at the end of the chain. Preferably, the polyhydroxylated fatty acid carries a single acid function.

Thus, in particular embodiments of the invention, a monomer implemented in the method is a dihydroxylated fatty acid, preferably with a single acid function.

Examples of polyhydroxylated fatty acids that can be implemented as a monomer in the method according to the invention include, without limitation, 10,16-dihydroxyhexadecanoic acid, or 9,10,18-trihydroxyoctadecanoic acid.

Preferably, it consists of 10,16-dihydroxyhexadecanoic acid, of formula (I') below:

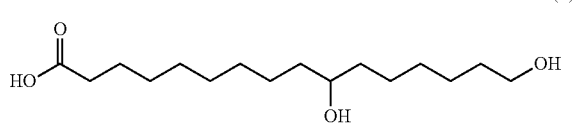

(I')

Esters that are particularly suitable for implementing the method according to the invention include methyl and ethyl esters of 10,16-dihydroxyhexadecanoic acid. The polyhydroxylated fatty acid(s) implemented as monomers in the method according to the invention may be synthesised chemically. They may otherwise be extracted from plants, more particularly from the cuticle of plants, and still more specifically from the cutin, by an enzymatic method or by acid or basic hydrolysis.

Cutin is a polymer network of polyhydroxylated fatty acids, mostly C16 and C18, crosslinked by ester bonds, which is involved in the waterproofing of leaves and fruits of higher plants. It is the main component of the plant cuticle, the continuous extracellular lipid membrane that covers the aerial parts of leaves and fruits of plants.

Preferably, the polyhydroxylated fatty acid(s) used as monomers in the method according to the invention are extracted from the tomato, which has the advantage of a great homogeneity of composition of the cutin from one species to another, this cutin further having a constituent monomer in a largely predominant amount: 10,16-dihydroxyhexadecanoic acid, which is present therein at more than 80% by weight.

Tomato transformation waste, called tomato pomace, contains a considerable amount of cutin, more specifically 60 to 70% cutin. It is estimated that 4 to 5 million tons of tomato pomace are produced every year in the world. Thus, the method according to the invention can quite advantageously allow recovering the agricultural and industrial waste formed by tomato pomace, which is of great interest both from an environmental and economic point of view.

In particular embodiments of the invention, a monomer used in the method according to the invention is obtained by depolymerisation of cutin, preferably tomato cutin.

Otherwise, the polyhydroxylated fatty acid(s) implemented as monomers in the method according to the invention may be extracted from other plants, such as apple (*Malus pumila*), sour orange (*Citrus aurantium*), broad beans (*Vicia faba*), wild cherry (*Prunus avium*), cranberry (*Vaccinium macrocarpon*), grape fruit (*Vitis vinifera*), pea seed (*Pisum sativum*), gooseberries (*Ribes grossularia*), papaya (*Malabar papalamarum*), agave leaves (*Agave americana*), grapefruit seeds (*Citrus paradisi*), lemon (*Citrus limon*), lime (*Citrus aurantifolia*), papaya fruit (*Carica papaya*), onion (*Allium cepa*), lingonberries (*Vaccinium vitis idaea*), coffee leaves (*Rubiaceae coffea*), rosehips (*Rosa canina*), squash (*Cucurbita pepo*), etc.

Any process for extracting cutin from plants, in particular for fragmenting tomato pomace or tomato skins, and any process for depolymerising this cutin, so as to obtain the polyhydroxylated fatty acid(s) used as monomer(s) in the method, can be implemented according to the invention. Basically, these methods include the fragmentation of tomato pomace, or other plant elements, such as apples, to extract the cutin, then the hydrolysis of the cutin to obtain the constituent monomers thereof. After isolation, by physical separation methods or by liquid-liquid extraction, the cutin is thus chemically hydrolysed, in particular by an alkaline route in an organic medium, or using specific enzymes, in particular cutinases.

An example of a method that can be implemented to this end is described in the document WO 2015/028299. This method comprises, schematically, the heat treatment of tomato skins, then their introduction into an alkaline solution, for example of potassium hydroxide at a concentration between 0.5 M and 6 M, at a temperature comprised between 20° C. and 130° C., for example between 65° C. and 130° C. Afterwards, the solution is filtered, and then acidified, in particular with hydrochloric acid at a concentration comprised between 12 M and 6 M. After centrifugation, for example at 10,000 to 14,000 rpm for 15 to 20 minutes, the pellet is washed, for example with demineralised water, and then, where appropriate, dried.

A preferred method according to the invention consists, after a step of decanting tomato pomace to recover the skins, and drying, grinding and defatting of the skins thus recovered, in hydrolysing them in an alkaline medium in an alcoholic solvent. As an example, such hydrolysis may be carried out by immersing the defatted and dehydrated skins in alcoholic potassium hydroxide (for example formed from 5% potassium hydroxide in anhydrous ethanol), at 50° C., for 6 hours at 5 days, preferably for 2 days. Afterwards, the mixture can be filtered under vacuum, and the ethanol eliminated by means of a rotary evaporator. The fatty acids contained in the obtained composition can be precipitated, in particular in water at a pH between 2 and 3, for example in a 37% hydrochloric acid solution, then recovered, in particular by centrifugation, for example at 9,000 rpm for 20 minutes. After rinsing(s) of the obtained pellet with demineralised water and lyophilisation, an oily composition is obtained, with a yield comprised between 60 and 70%, which composition contains essentially fatty acids, in majority 10,16-dihydroxyhexadecanoic acid.

More specifically, this oily composition obtained upon completion of the cutin depolymerisation operations contains at least 85% by weight of fatty acids. The 10,16-dihydroxyhexadecanoic acid preferably represents therein at least 88% by weight of these fatty acids. This composition, which also contains phenolic and carotenoid compounds absorbing at 380, 288 and 225 nm, as well as other substances in small amounts, in particular phenolic compounds in a concentration of about 0.5 to 3% by weight, can advantageously be directly used in the method according to the invention.

The polyhydroxylated fatty acid ester that can be implemented according to the invention can be prepared by esterification of the corresponding fatty acid according to any method conventional in itself for a person skilled in the art, without catalysis or preferably with acid catalysis. It can otherwise be obtained by transesterification of the polyhydroxylated fatty acids contained in the cutins of plants, preferably operated with acid catalysis or basic catalysis, using a strong base or alcoholates such as sodium methanolate or sodium ethanolate. The alcohol used to carry out the esterification or transesterification reaction of the fatty acid preferably includes from 1 to 18 carbon atoms and preferably from 1 to 8 carbon atoms. It is preferably selected amongst methanol, ethanol, propanol, butanol, pentanol, hexanol and its isomers including 2-ethyl-butanol, heptanol and its isomers such as 2-heptanol, octanol and its isomers such as 2-ethyl-hexanol, and also isopropanol, 2-methyl-propanol, 2-methyl-propan-2-ol, butan-2-ol, amyl alcohols, 2-methyl-butanol, 3-methyl-butanol, 2,2 dimethylpropanol, pentan-3-ol, pentan-2-ol, 3-methylbutan-2-ol, 2-methylbutan-2-ol, Guerbet alcohols such as 2-propyl-heptanol, 2 butyl-octanol.

As an example, a polyhydroxylated fatty acid ester that can be implemented in the method according to the invention can be produced directly from tomato skins, by bringing these skins into contact with alcohol, in particularly methanol or ethanol, in the presence of an acid, for example 2 to 5% concentrated sulfuric acid, at a temperature comprised between 50 and 70° C. for at least 6 hours. The esters obtained upon completion of the transesterification reaction can be purified by addition of water to the reaction medium and then centrifugation.

In particular embodiments of the invention, the preparation of the reaction medium comprises mixing a polyol with a composition resulting from the depolymerisation of cutin, preferably tomato cutin or apple cutin. This composition, which is preferably rich in dihydroxylated fatty acids, preferably contains at least 20%, preferably at least 80%, by weight of the monomer with respect to the total weight of hydroxylated fatty acids contained in the composition. The monomer may be present therein in the form of an acid or in the form of an ester, depending on the operating mode that has been used to carry out the depolymerisation of the cutin.

In particular embodiments of the invention, this composition resulting from the depolymerisation of cutin preferably contains at least 20%, preferably at least 80%, by weight of the monomer with respect to the total weight of the composition.

Preferably, the monomer included therein is a dihydroxylated fatty acid.

Preferably, the reaction medium essentially consists of only such a composition and the polyol.

Preferably, this reaction medium, and the elastomer that it allows forming, are entirely bio-based.

In particular embodiments of the invention, the molar ratio between the polyol, in particular the glycerol, and the monomer(s) or the composition resulting from the polymerisation of cutin in the reaction medium, is comprised between 0.16 and 1.04. When the monomer is contained in a composition resulting from the depolymerisation of cutin, this ratio applies between the polyol, in particular glycerol, and this composition, the number of moles of which is then determined by assimilating its molar mass to that of the 10,16-dihydroxyhexadecanoic acid. Preferably, the step of preparation of the reaction medium of the method according to the invention is carried out at a temperature higher than or equal to 50° C. Such a feature advantageously facilitates a homogeneous mixing of the monomer and the polyol, and all the more so when the reaction medium is free of any solvent.

Preferably, the operating conditions implemented during the heating step are selected so as not to cause the evaporation of the polyol present in the reaction medium.

In particular embodiments of the invention, the heating step is carried out in a temperature range comprised between 120 and 200° C., in particular at a temperature of about 150° C. The temperature applied during the initial phase of the heating step, preferably defined as the phase taking place before the gel point of the polymer is reached, may be identical, or different, compared to the temperature applied during the second phase of the heating step, which is defined as the phase taking place after the initial phase, until the end of the heating step.

Preferably, the heating step is carried out for a period of at least 4 hours, preferably comprised between 4 and 60 hours and preferably comprised between 5 and 28 hours, for example between 22 and 28 hours.

In particular, the initial phase of the heating step may be carried out for a period preferably comprised between 30 and 5 hours, preferably comprised between 1 and 3 hours, in particular a period of about 90 minutes.

As explained hereinbefore, in particularly advantageous preferred embodiments of the invention, the initial phase of the heating step is carried out at a pressure comprised between 0 and 900 mbar, preferably comprised between 100 and 900 mbar, and preferentially comprised between 400 and 800 mbar. Such a feature not only promotes the evaporation of the water formed out of the reaction medium, and therefore the kinetics of the reaction of esterification of the polyol by the ω-hydroxylated fatty acid, but it also allows, surprisingly, maximising the percentages by weight of esterified monomer and polyol, i.e. involved in an ester bond within the formed polymer, as well as the elasticity properties of this polymer. In particular, the implementation of a pressure lower than 100 mbar causes the evaporation of polyol, in particular of glycerol, out of the reaction medium, and results in the formation of a polymer whose rubber elastic properties are less satisfactory than when the applied pressure is higher than or equal to 200 mbar; and the implementation of a pressure higher than 900 mbar reduces the esterification rates of the polyol and of the monomer in presence.

Within the range from 0 to 900 mbar, in general, it is observed that the lower the pressure applied, the lower will be the rate of free hydroxyl functions in the polymer formed by the method according to the invention, which can be easily checked by analysis of the polymer by infrared spectroscopy, by observing the band corresponding to the free hydroxyl groups, at 3500 cm$^{-1}$. Furthermore, as regards the nature of these free hydroxyl functions, when the reduced pressure applied is within the preferred range of values recommended by the invention, in cases where the monomer is a dihydroxylated fatty acid, the relative proportion in the polymer of fragments of the monomer in which the hydroxyl functions are all esterified does not exceed 80%, and preferably 70%. It has been discovered by the present inventors that the higher the relative proportion in the polymer of fatty acid fragments in which the hydroxyl functions are all esterified, the less good will be the rubber properties of the latter. Furthermore, the relative proportion of fragments of the monomer in which free secondary hydroxyl functions remain is less than or equal to 40%, which also turns out to be advantageous with regards to the elastic properties of the polymer.

Preferably, the method according to the invention comprises, during the heating step, before the gel point of said polymer has been reached, a step of eliminating the bubbles present in the reaction medium. This step may be carried out by any means, for example by stirring, whether manual or automatic, of the reaction medium. It may be carried out continuously, in particular throughout the duration of the initial phase of the heating step, or else be carried out occasionally, on one or more occasions during the heating step, and in this case preferably at least once just before, for example 1 to 5 minutes before, the gel point of the polymer is reached. In a particular embodiment of the invention, the step of eliminating the bubbles present in the reaction medium comprises at least one phase of stirring the reaction medium just before the polymer present in the reaction medium has reached its gel point, for example when the longest reaction time for which the reaction medium remains completely soluble in the presence of the solvent in the solubility test described above has been reached.

The heating of the reaction medium can optionally be interrupted during a phase of occasional stirring of the reaction medium in order to remove the bubbles that have formed therein.

The second phase of the heating step may be carried out for an adequate period of time to obtain the desired crosslinking degree for the elastomer. This duration is preferably at least 4 hours, and preferably between 4 and 48 hours, for example around 24 hours.

Preferably, no reagent or other substance is added in the reaction medium before or during the second phase of the heating step.

Preferably, the operating conditions implemented during the heating step are chosen so as to obtain a crosslinking degree of the polymer higher than or equal to 50%, in particular comprised between 50 and 90%.

The method according to the invention advantageously allows forming an elastomer whose properties, in particular elasticity properties, and the glass-transition temperature, can be modulated in particular as a function of the content of polyol, preferably of glycerol, implemented, the glycerol serving in particular, in this polymer, both as a constituent monomer of the polymer and as a plasticiser, and as a function of the value of reduced pressure applied during the heating step and of the duration of application of this reduced pressure.

According to a second aspect, the invention relates to a polymer, of the polyester type, hydrophobic, obtainable by a method according to the invention.

A monomer unit of this polymer is a polyhydroxylated fatty acid.

In particular, this polymer may be formed from at least one polyol and at least one polyhydroxylated fatty acid, or from an ester of such a fatty acid as defined hereinbefore, in particular based on glycerol and 10,16-dihydroxyhexadecanoic acid, and where appropriate other monomers.

It has a rubber elasticity that varies as a function of the content of polyol, in particular of glycerol, included in it. This polymer, which could be qualified as an elastomer, is in particular all the more elastic as it contains more polyol, in particular glycerol.

Its glass-transition temperature may vary between −12.5 and −25° C., depending on its polyol, in particular glycerol, content. This glass-transition temperature is measured by differential enthalpy analysis (DEA or Differential Scanning Calorimetry (DSC)), comprising the application of a temperature scanning to a polymer sample, from a temperature of −50° C. up to a temperature of 80° C. with a temperature rise ramp of 3° C./min. This analysis is preferably carried out on an amount of polymer of 10 mg, placed in a hermetic aluminium capsule.

The polymer according to the invention has a very high molecular weight, and a crosslinking rate comprised between 50 and 90%. This crosslinking rate, which is defined as the rate of hydroxyl functions of the monomer that are involved in an ester bond within the polymer, can be determined in any manner conventional in itself, in particular by labelling the free hydroxyl functions of the polymer. In other words, the polymer according to the invention is such that the rate of hydroxyl functions carried by the monomer unit, which are free, is comprised between 10 and 50%. This rate of free hydroxyl functions can be determined in any manner conventional in itself for a person skilled in the art. As an example, it can be determined by chemical labelling of the free hydroxyl functions within the polymer, this labelling being resistant to reactions of depolymerisation of the polymer, for example by benzyl etherification, as described in the publication of Philippe et al., 2016, Plant Physiology, DOI:10.1104/pp. 15.01620); then depolymerisation and measurement of the respective proportions, in the monomers thus released, of the labelled hydroxyl functions, which were therefore not involved in covalent bonds in the polymer, and of the unlabelled hydroxyl functions, which were therefore involved in covalent bonds in the polymer.

This polymer is insoluble in most solvents, in particular in water, ethanol, methanol, isopropanol, chloroform, dichloromethane, dimethyl sulfoxide, and tetrahydrofuran, or any of their mixtures. It differs in that from dendritic polymers, which are soluble in many solvents. In the present description, by "insoluble", it should be understood the fact that the percentage by weight of polymer not dissolved in a volume of solvent in which it is immersed, after stirring for 18 hours at room temperature, is higher than 85%.

An example of architecture of this polymer is shown in FIG. 1, for the case where the monomer is 10,16-dihydroxyhexadecanoic acid and the polyol is glycerol. This polymer comprises fragments of the dihydroxylated fatty acid in which the hydroxyl functions are both esterified, fragments in which free primary hydroxyl functions remain, and fragments in which free secondary hydroxyl functions remain.

The relative proportion of each of these fragments in the polymer can be determined in any manner conventional in itself. For example, it is possible to apply the method described in the publication of Philippe et al., in Plant Physiology, 2016, 170, 807-820. In brief, this method consists in labelling the free hydroxyl functions of the polymer, in carrying out the depolymerisation thereof, in separating the obtained monomer fragments and in analysing them in order to assess the presence and the type of labelled hydroxyl functions.

As an example of an experimental protocol that can be applied, 5 mg of polymer are mixed in a plugged glass tube for 24 hours with 50 mg of 2-benzyloxy-1-methylpyridinium triflate and 6 mg of magnesium oxide in 1 ml of tri-fluorotoluene at 90° C. Afterwards, the polymer is rinsed with dichloromethane and dried.

Afterwards, the marked polymer is depolymerised using a weak base, such as 0.5 M sodium methanolate, in anhydrous methanol. This depolymerisation may be carried out for 16 hours at 60° C. An aliquot of this fraction is sampled and injected for analysis by gas chromatography coupled with mass spectrometry (GC-MS) after silylation.

Preferably, the relative proportion in the polymer of fragments of the fatty acid in which the hydroxyl functions are both esterified does not exceed 80%, and preferably 70%. It has been discovered by the present inventors that the higher the relative proportion of fragments of the fatty acid in which the hydroxyl functions are both esterified, in the polymer, the poorer will be the rubber properties of the latter. A relative proportion higher than 80%, which is indicative of the presence within the polymer of a significant amount of branched chains, is associated with insufficient rubber properties, and in particular with a very low stretch capacity of the polymer.

Preferably, the polymer according to the invention is derived from raw materials recycling, and is itself recyclable.

This polymer, by the modularity of its properties, can be used for many and various applications.

In particular embodiments of the invention, the polymer has at least one, preferably several, of the following features:

it has crystalline zones, it has a melting temperature higher than or equal to 40° C., more particularly comprised between 40° C. and 42° C., it has a storage modulus (elastic response in dynamic mechanical analysis) at 50° C. comprised between 1.4 and 1.6 MPa, it has a mechanical relaxation temperature lower than 2° C., it has a Young's modulus comprised between 1.10 and 1.20 MPa, it has a tensile strength comprised between 1.2 and 1.6 MPa.

The polymer further features an elongation at break greater than 100%, and even greater than 150%.

The features and advantages of the invention will appear more clearly in light of the examples of implementation hereinafter, provided merely for illustration of the invention without limitation, with reference to FIGS. 1 to 25, wherein:

FIG. 1 shows an example of architecture of a polymer according to the invention, obtained from glycerol and 10,16-dihydroxyhexadecanoic acid.

FIG. 2 represents a graph showing the percentage by weight, with respect to the initial weight of glycerol in the reaction medium, of esterified glycerol upon completion of the implementation of a method according to the invention for the preparation of a polymer from glycerol and from an oily composition extracted from tomato cutin, as a function of the initial weight content of glycerol in the reaction medium.

FIG. 3 represents a graph showing the percentage by weight, with respect to the initial weight of fatty acids in the reaction medium, of esterified fatty acids upon completion of the implementation of a method according to the invention for preparing a polymer from glycerol and an oily composition extracted from tomato cutin, as a function of the initial weight content of glycerol in the reaction medium.

FIG. 4 shows the spectra obtained by Fourier-transform infrared spectroscopy, respectively for a polymer prepared by a method according to the invention, from glycerol and from an oily composition extracted from tomato cutin, with an initial weight content of 25% glycerol ("PG25%"), a pressure of 400 mbar having been applied during the initial phase of the heating step; and for this oily composition extracted from tomato cutin ("CH").

FIG. 5 shows an enlargement of an area of the spectra of FIG. 4.

FIG. 6 shows an enlargement of an area of the spectra obtained by Fourier-transform infrared spectroscopy, for polymers prepared by methods according to the invention, from glycerol and an oily composition extracted from tomato cutin, with an initial glycerol weight content of 15%, respective pressures of 0, 200, 400, 600, 800 and 1,000 mbar having been applied during the initial phase of the heating step.

FIG. 7 represents a bar graph showing, for a comparative polymer without glycerol ("PG0%") and for polymers prepared by methods in accordance with the invention from glycerol and an oily composition extracted from tomato cutin, with initial weight contents of glycerol respectively from 5 to 25% ("PG5%" to "PG25%"), a pressure of 400 mbar having been applied during the initial phase of the heating step, the relative proportions in the polymers of the fragments derived from 10,16-dihydroxyhexadecanoic acid that are completely esterified (IIIa), that are esterified on the primary hydroxyl function only (IIIc) and that are esterified on the secondary hydroxyl function only (IIIb).

FIG. 8 represents a bar graph showing, for polymers prepared by methods in accordance with the invention from glycerol and from an oily composition extracted from tomato cutin, with an initial weight content of glycerol of 15%, respective pressures of 0, 200, 400, 600, 800 and 1,000 mbar having been applied during the initial phase of the heating step, the relative proportions in the polymers of the fragments resulting from 10,16-dihydroxyhexadecanoic acid that are completely esterified (IIIa), that are esterified on the primary hydroxyl function only (IIIc) and that are esterified on the secondary hydroxyl function only (IIIb).

FIG. 9 represents a bar graph showing, for polymers prepared by methods in accordance with the invention from glycerol and from an oily composition extracted from tomato cutin, with initial weight contents of glycerol respectively from 5 to 25% ("PG5%" to "PG25%"), a pressure of 400 mbar having been applied during the initial phase of the heating step, the relative proportions in the polymers of the fragments resulting from glycerol that are completely esterified (IVa), that are esterified on the hydroxyl functions in position 1 or 3 only (IVb) and that are esterified on the hydroxyl function in position 2 only (IVc).

Figure 23:
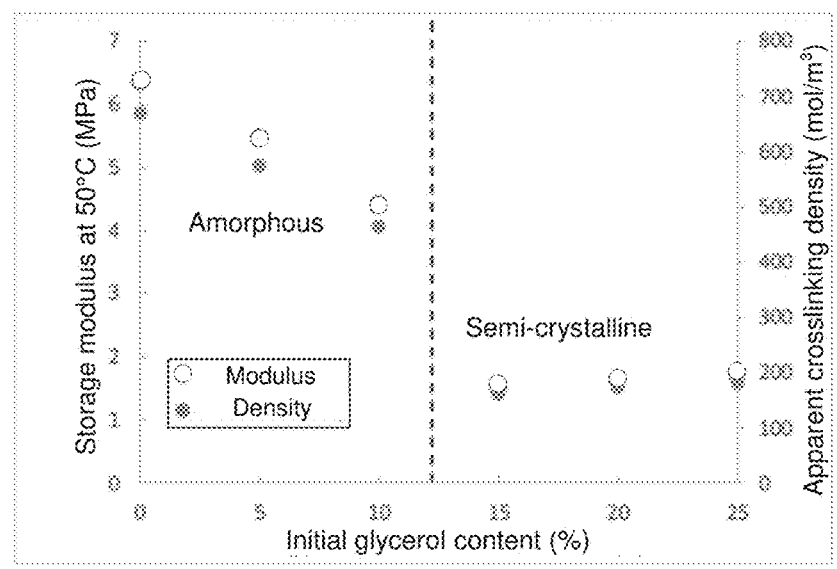

FIG. 23 shows a graph representing, on the one hand, the storage modulus at 50° C. and, on the other hand, the apparent crosslinking density, as a function of the initial weight content of glycerol in the reaction medium, for polymers prepared by a method according to the invention from glycerol and from an oily composition extracted from tomato cutin, a pressure of 400 mbar having been applied during the initial phase of the heating step.

Figure 24:
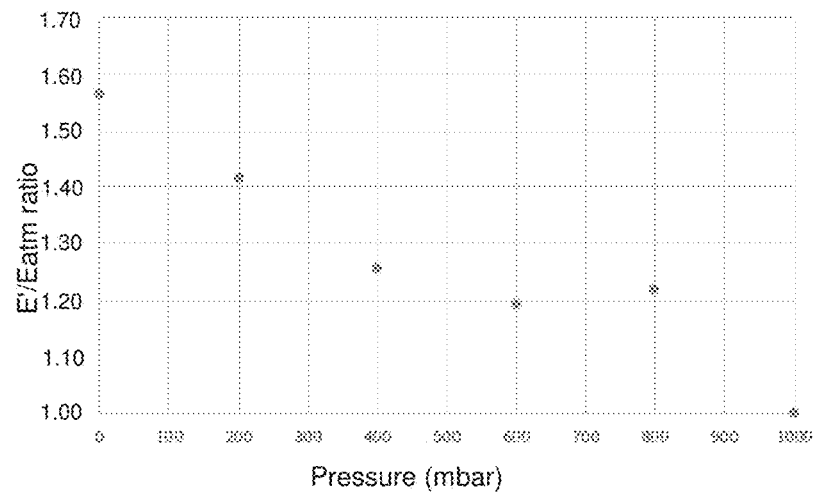

FIG. 24 shows a graph representing the "storage modulus/ storage modulus at atmospheric pressure" ratio (E'/Eatm ratio), as a function of the pressure applied during the heating step of a method according to the invention implementing glycerol and an oily composition extracted from tomato cutin, with an initial weight content of glycerol of 25%.

Figure 25:
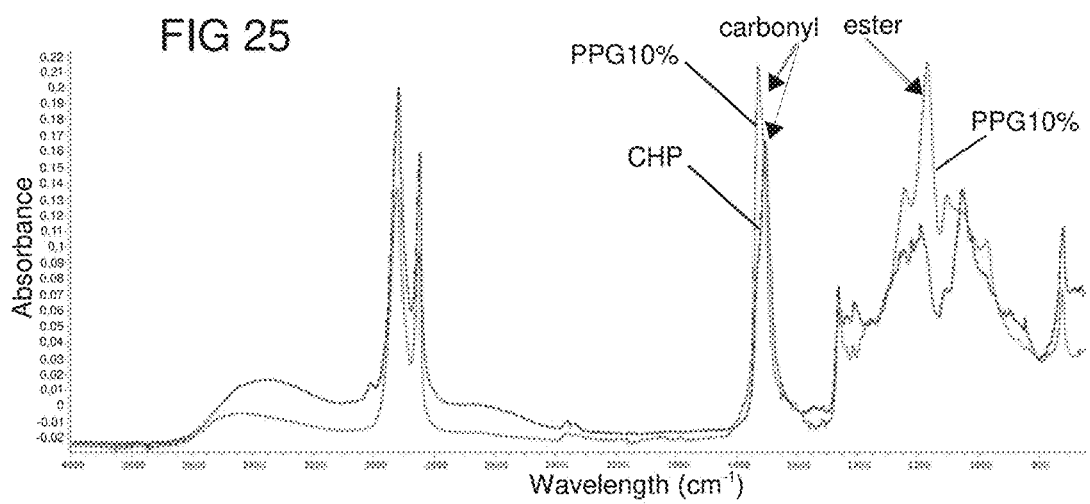

FIG. 25 shows the spectra obtained by Fourier-transform infrared spectroscopy, respectively for a polymer prepared by a method according to the invention, from glycerol and from an oily composition extracted from apple cutin, with an initial weight content of 10% glycerol ("PPG10%"), a pressure of 400 mbar having been applied during the initial phase of the heating step; and for this oily composition extracted from apple cutin ("CHP").

EXPERIMENT 1—TOMATO CUTIN

Preparation of a Composition Containing a ω-Hydroxylated Fatty Acid from Tomato Pomace A method for preparing an elastomer in accordance with the invention is implemented as follows, from glycerol and an oily composition extracted from tomato cutin.

Tomato skins are isolated by decantation from tomato pomace. These skins are dried, crushed and delipidated by reflux in a Soxhlet extractor using an acetone:ethanol (1:1) mixture for 2 days. Afterwards, they are dehydrated. 200 g of the tomato skins thus previously dewaxed and dehydrated are suspended in 1 l of a 5% solution of potassium hydroxide KOH prepared in anhydrous ethanol. The mixture is heated at 50° C. for 16 hours. Afterwards, the suspension is filtered under vacuum by passage through an A0 (160-250 μm) size frit, the volume of ethanol is reduced by evaporation, then the filtrate is diluted with water and acidified to pH 3-4 using a 37% hydrochloric acid HCl solution. The suspension thus formed is centrifuged at 8,000 rpm for 15 min at 20° C., then the centrifugation pellet is recovered, washed with water then vacuum dried. 150 g of an oily composition consisting mainly of fatty acids (for more than 85% by weight), as well as small amounts of unidentified pigments, including colouring substances absorbing at 300, 288 and 225 nm, are thus obtained. An analysis of this composition by gas chromatography coupled with mass spectrometry GC-MS/FID shows that the fatty acid fraction of this oily composition includes a ω-hydroxylated fatty acid content of more than 90%. The weight percentage composition of the fatty acid fraction of the oily composition thus obtained is indicated in Table 1 hereinafter.

TABLE 1

| Constituent | Content in the extract (%) |
| --- | --- |
| p-coumaric acid | 0.9 |
| hexadecanoic acid | 2.04 |
| linoleic acid | 0.46 |
| oleic acid | 0.28 |
| stearic acid | 0.05 |
| 16-hydroxyhexadecanoic acid | 3.6 |
| 1,16-hexadecanedioic acid | 0.61 |
| 10,16-dihydroxyhexadecanoic acid | 89.66 |
| hydroxyhexadecan-1,16-dioic acid | 2.12 |
| dihydroxyoctanoic acid | 0.28 |

10,16-dihydroxyhexadecanoic acid is the largely majority constituent of this oily composition, of which it represents almost 90% by weight of the majority fraction.

Preparation of Polymers Based on the Oily Composition and Glycerol

The desired amount of the obtained oily composition is introduced into a stainless steel mould, with dimensions 4×4 cm, covered with Teflon. The whole is preheated in an oven (Thermo Scientific F1B65500) at 60° C. for 5 min.

Afterwards, the desired amount of glycerol is introduced into the mould, this amount varying between 5 and 25% by weight, with respect to the total weight of the mixture of glycerol and of the oily composition, which is set at 1.8 g in these examples.

As a comparative example, an experiment is carried out with the oily composition alone, without adding glycerol.

The different amounts of glycerol implemented are indicated in Table 2 hereinafter.

TABLE 2

| Polymer | PG0% | PG5% | PG10% | PG15% | PG20% | PG25% |
| --- | --- | --- | --- | --- | --- | --- |
| Weight percentage of glycerol in the reaction medium (%) | 0 | 5 | 10 | 15 | 20 | 25 |

TABLE 2-continued

| Polymer | PG0% | PG5% | PG10% | PG15% | PG20% | PG25% |
|---|---|---|---|---|---|---|
| Glycerol/fatty acids* molar ratio | 0 | 0.16 | 0.35 | 0.55 | 0.78 | 1.04 |
| Glycerol moles: fatty acid moles* | / | 1:6.2 | 1:2.9 | 1:1.8 | 1:1.3 | 1:0.96 |

*the number of moles of fatty acids is determined considering that the oily composition contains only fatty acids, all with the same molar mass as 10,16-dihydroxyhexadecanoic acid No other compound, in particular no catalyst or solvent, is introduced into the reaction medium.

The mould containing the reaction medium thus formed is introduced into the oven at 60° C., and the reaction medium is homogenised by manual stirring by means of a spatula for 5 min. A drying agent (phosphorus oxide P2O5) is also introduced into the oven.

A temperature of 150° C., and a reduced pressure, are then applied in the oven for an initial phase lasting 90 min. The copolymerisation of the fatty acids contained in the oily composition and of the glycerol occurs in the reaction medium, as well as the onset of crosslinking of the polymer thus formed.

Different experiments are carried out at different pressure values: 0, 200, 400, 600, 800 and 1,000 mbar.

The pressure in the oven is brought back to atmospheric pressure at the end of this initial phase, just before reaching the gel point of the polymer, and the bubbles having formed in the reaction medium are eliminated by manual stirring, every 5 min for 20 min.

Afterwards, heating is carried on, during the second phase of the heating step, for 22 hours at 150° C., at atmospheric pressure, to continue the crosslinking of the polymer.

Figure 1:
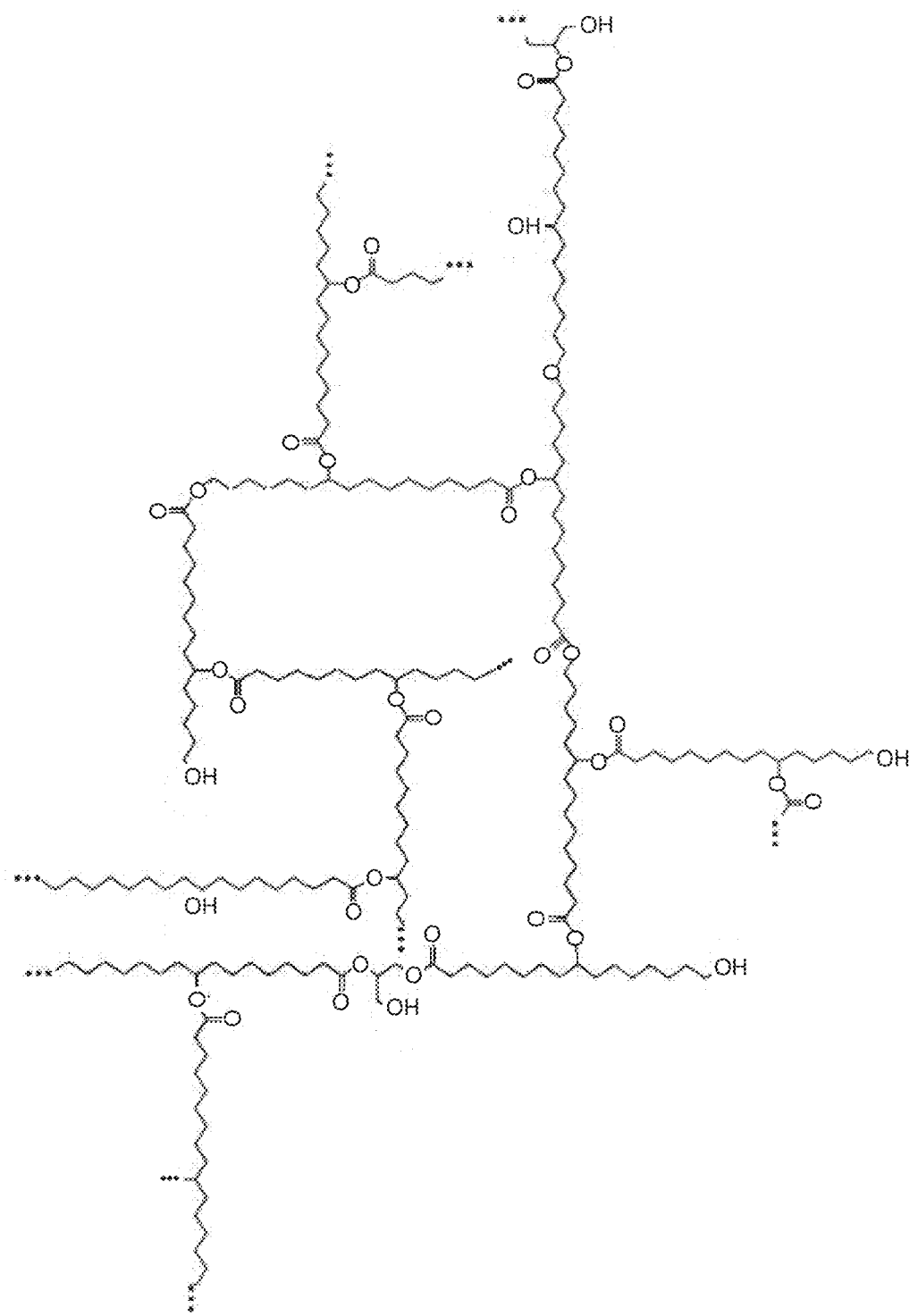

Upon completion of this heating step, the mould is removed from the oven and cooled in an ice bath. A solid polymer is recovered therefrom which, for the examples with glycerol, has elastic deformation properties. This polymer has an architecture, an example of which is shown in FIG. 1. Ester-type bonds have formed between carboxylic acid groups of the fatty acids and hydroxyl groups of the hydroxylated fatty acids and glycerol.

Analysis of the Esterification Rate of the Initial Reagents

For each of the formed polymers, the percentage of esterified glycerol and the percentage of esterified fatty acids are determined. A compound is considered to be esterified when at least one of its functions is engaged in an ester bond within the polymer.

To this end, 5 mg of polymer are immersed in 1 ml of methanol for 16 hours, at room temperature and under stirring, in order to recover the glycerol and the non-esterified fatty acids. An aliquot of this methanol fraction containing glycerol and the free fatty acids is sampled and injected in GC-MS after silylation. Secondly, the "washed" polymer, i.e. containing only glycerol and esterified fatty acids, is depolymerised using a weak base (0.5 M sodium methanolate) in anhydrous methanol. This depolymerisation is performed for 16 hours, under stirring at room temperature. In order to complete the depolymerisation, the mixture is heated for 2 hours at 60° C. An aliquot of this fraction is sampled and injected in GC-MS after silylation. The different glycerol and fatty acid contents are determined thanks to internal standards.

Figure 2:
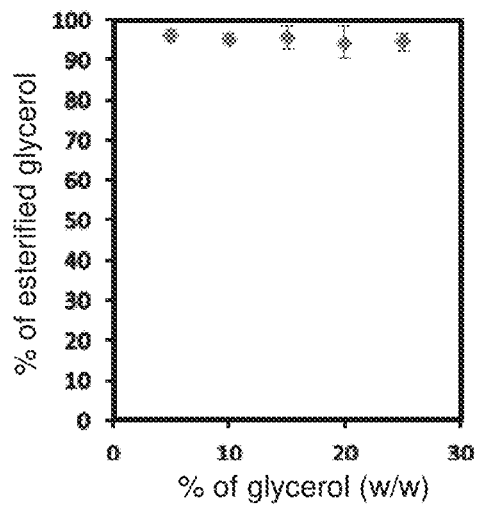
Figure 3:
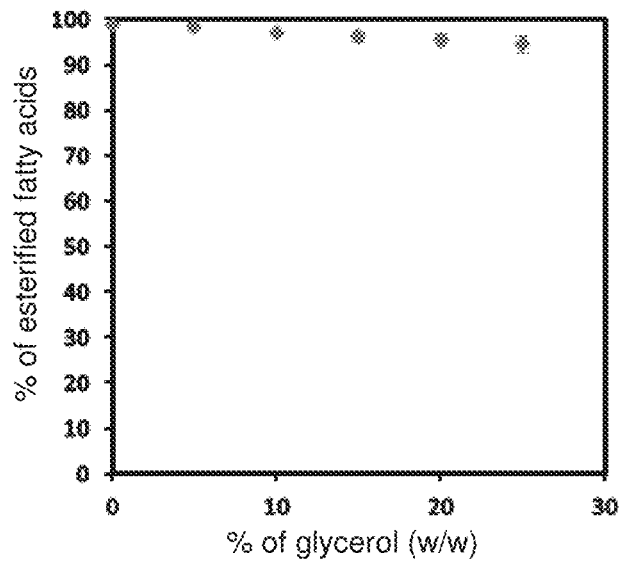

The obtained results, in terms of % of esterified product as a function of the content by weight of glycerol in the initial reaction medium, are shown in FIG. 2 for the glycerol, and in FIG. 3 for the fatty acids. It is observed that for both the glycerol and the fatty acids, the content by weight of the compounds engaged in an ester bond within the polymer is higher than 85%.

Analysis of the Polymers by Infrared Spectroscopy

The polymers that have been obtained, as well as the initial oily composition, are analysed by Fourier-transform infrared spectroscopy (FTIR).

To this end, a Nicolet MAGNA-IR 550 spectrometer commercialised by Thermo Scientific, controlled by the OMNIC® software, is used. The resolution is set at 2 cm$^{-1}$ and 30 acquisitions are done for each spectrum.

Figure 4:
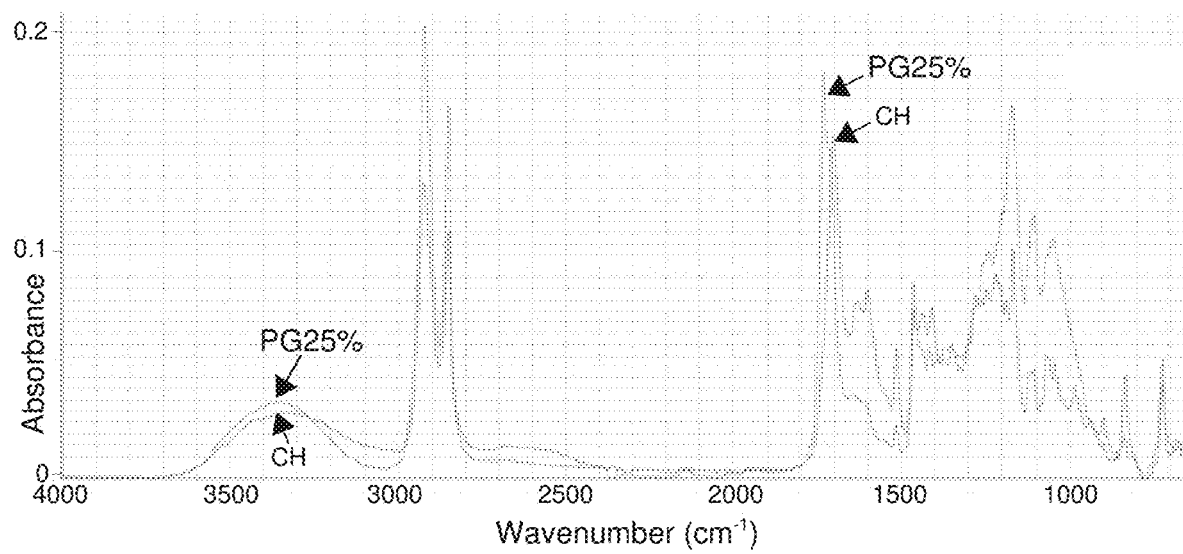
Figure 5:
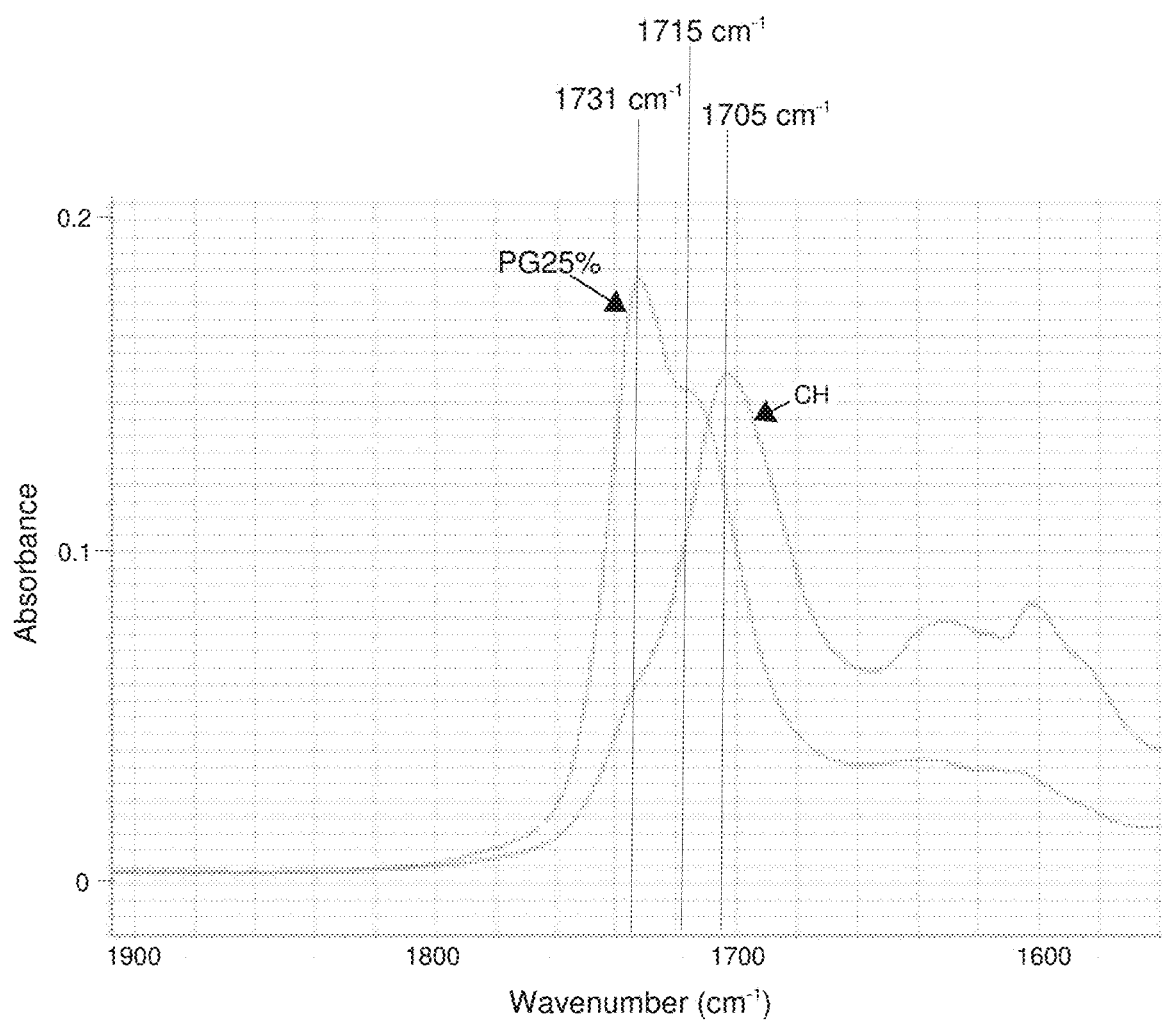

The spectra obtained, for the initial oily composition (CH) and, as an example, the PG25% polymer (initial glycerol content of 25%) obtained at a reduced pressure of 400 mbar, are shown in FIG. 4. FIG. 5 shows an enlargement of an area of these spectra.

These spectra clearly show the polyester nature of the PG25% polymer formed in accordance with the invention. As can be seen, the initial oily composition actually presents an intense monomodal carbonyl band centred around 1705 cm$^{-1}$, characteristic of acids. For the PG25% elastomer, we observe the displacement of this band at a wavelength characteristic of esters, of 1731 cm$^{-1}$. The ester carbonyl band is split with a shoulder at 1715 cm$^{-1}$ which reflects the formation of hydrogen bonds with non-esterified hydroxyl groups (of the hydroxylated fatty acids and/or the glycerol). The decrease in the characteristic hydroxyl band, at 3500 cm$^{-1}$, between the spectrum of the initial oily composition and that of the PG25% elastomer, further confirms the esterification of the hydroxyl groups of the hydroxylated fatty acids.

Similar spectra are obtained for all of the polymers prepared, regardless of the initial content of glycerol used and regardless of the pressure applied.

These results prove in particular that it is possible to assess, and to follow in real-time during time-temperature kinetics, the level of polymerisation by following the intensity of the ester carbonyl band at 1731 cm$^{-1}$, with respect to the intensity of the unesterified carbonyl band (carboxylate) at 1705 cm$^{-1}$.

Figure 6:
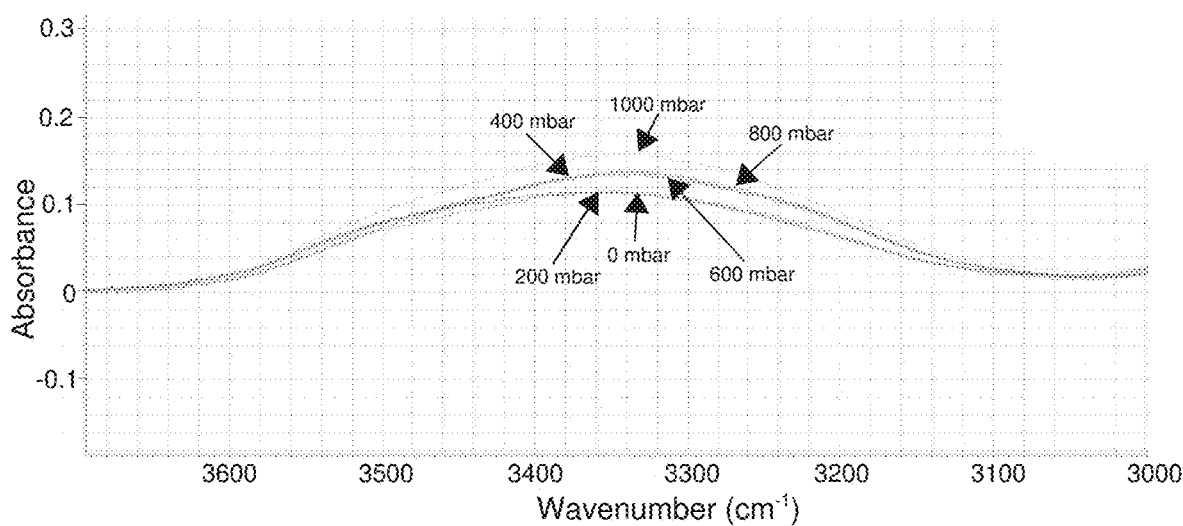

FIG. 6 shows an enlargement of an area of these spectra, centred on the characteristic band of the hydroxyl functions, for the particular example of the PG15% polymer (initial glycerol content of 15%), at all of the pressure values tested. We observe that the intensity of the characteristic band of hydroxyl groups decreases with the value of the pressure applied during the heating step. This demonstrates that the lower the pressure applied in the device, the lower will be the number of free hydroxyl functions in the polymer. The pressure of 1,000 mbar gives an unsatisfactory level of unesterified hydroxyl functions.

Comparable results are obtained for all of the other initial glycerol contents tested.

Analysis of the Nature of the Esterified Hydroxyl Groups

For each polymer formed, the relative proportion of hydroxyl groups of 10,16-dihydroxyhexadecanoic acid that have been esterified is further determined.

To this end, as explained hereinbefore, the method described in the publication by Philippe et al., in Plant Physiology, 2016, 170, 807-820 is applied. 5 mg of polymer are mixed in a plugged glass tube for 24 hours with 50 mg of 2-benzyloxy-1-methylpyridinium triflate (Sigma-Aldrich) and 6 mg of magnesium oxide in 1 ml of trifluorotoluene at 90° C. Afterwards, the polymer is rinsed with dichloromethane and dried. Afterwards, the labelled polymer is depolymerised using 0.5 M sodium methanolate. This depolymerisation is performed for 16 hours at 60° C. An aliquot of this fraction is sampled and injected in gas chromatography coupled with mass spectrometry (GC-MS) after silylation.

Thus, for each polymer obtained, the relative proportions by weight are determined for the fragments corresponding to: 10,16-dihydroxyhexadecanoic acid esterified at its two hydroxyl functions, of formula (IIIa) below; 10,16-dihydroxyhexadecanoic acid esterified at its secondary hydroxyl function only, of formula (IIIb) below; 10,16-dihydroxyhexadecanoic acid esterified at its primary hydroxyl function only, of formula (IIIc) below.

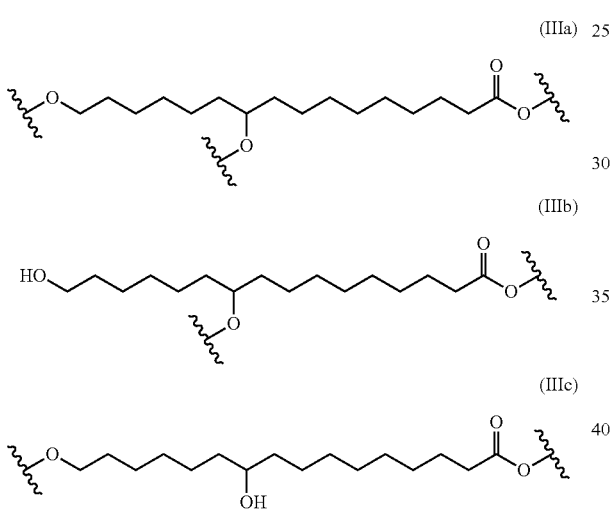

Figure 7:
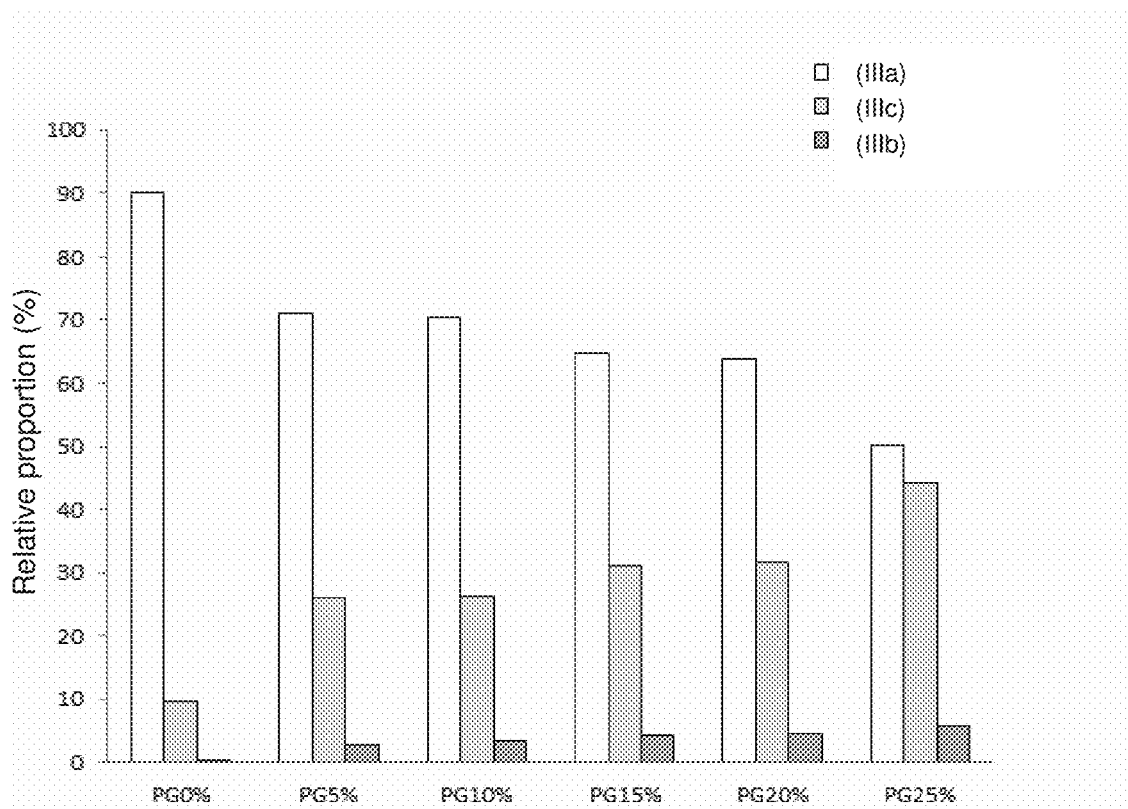

The obtained results are shown in FIG. 7, for the polymers formed at the pressure of 400 mbar. It is observed that the esterification pattern of the hydroxyl groups of 10,16-dihydroxyhexadecanoic acid is different depending on the initial weight content of glycerol. The primary hydroxyl groups, i.e. positioned at the end of the chain, in position ω, are those that are most involved in the esterification/crosslinking reactions, compared to the secondary hydroxyl groups, positioned in the middle of the chain of the fatty acid. Furthermore, for all of the polymers obtained from glycerol, the proportion of fragments in which the two hydroxyl functions are esterified is lower than 70%.

Figure 8:
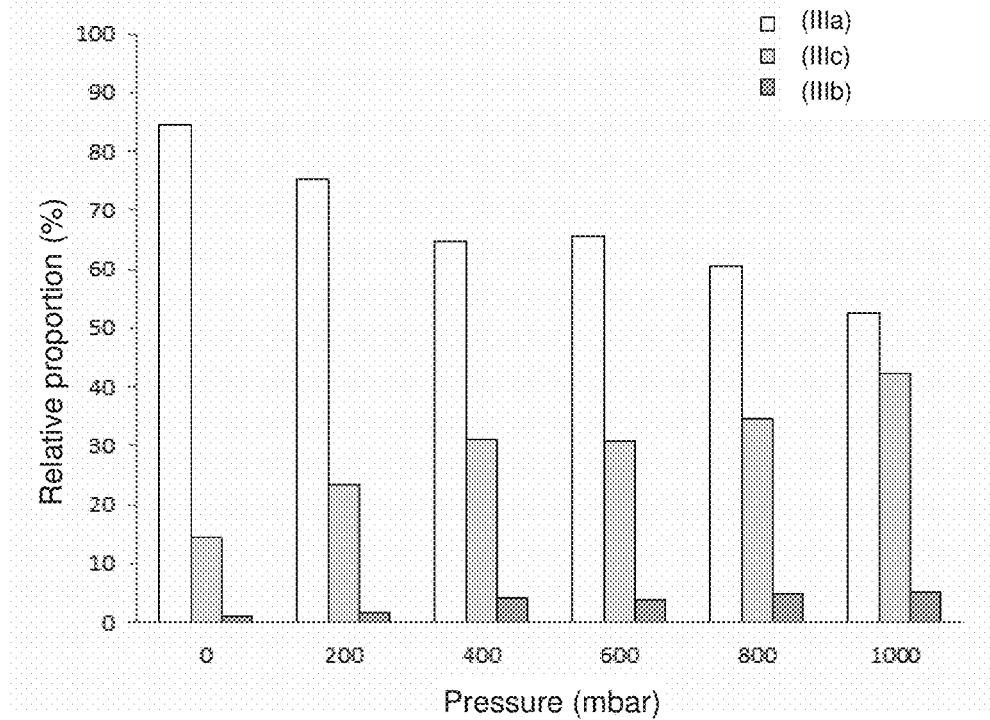

FIG. 8 shows the results obtained for the PG15% polymers, for all of the pressure values tested. At the value of 0 mbar, the proportion of fragments in which the two hydroxyl functions are esterified is higher than 80%, which is unsatisfactory. The relative proportions associated with the most advantageous mechanical properties of the polymer are obtained for pressures between 400 and 800 mbar.

For each polymer formed, the relative proportion of the glycerol hydroxyl groups that have been esterified is also determined.

Thus, for each obtained polymer, the relative proportions by weight are determined for the fragments corresponding to: glycerol esterified at its three hydroxyl functions, of formula (IVa) below; glycerol esterified at its hydroxyl functions in position 1 or 3 only, of formula (IVb) below; glycerol esterified at its hydroxyl function in position 2 only, of formula (IVc) below.

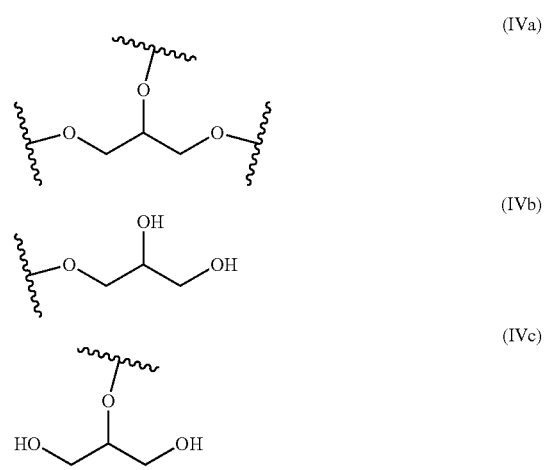

Figure 9:
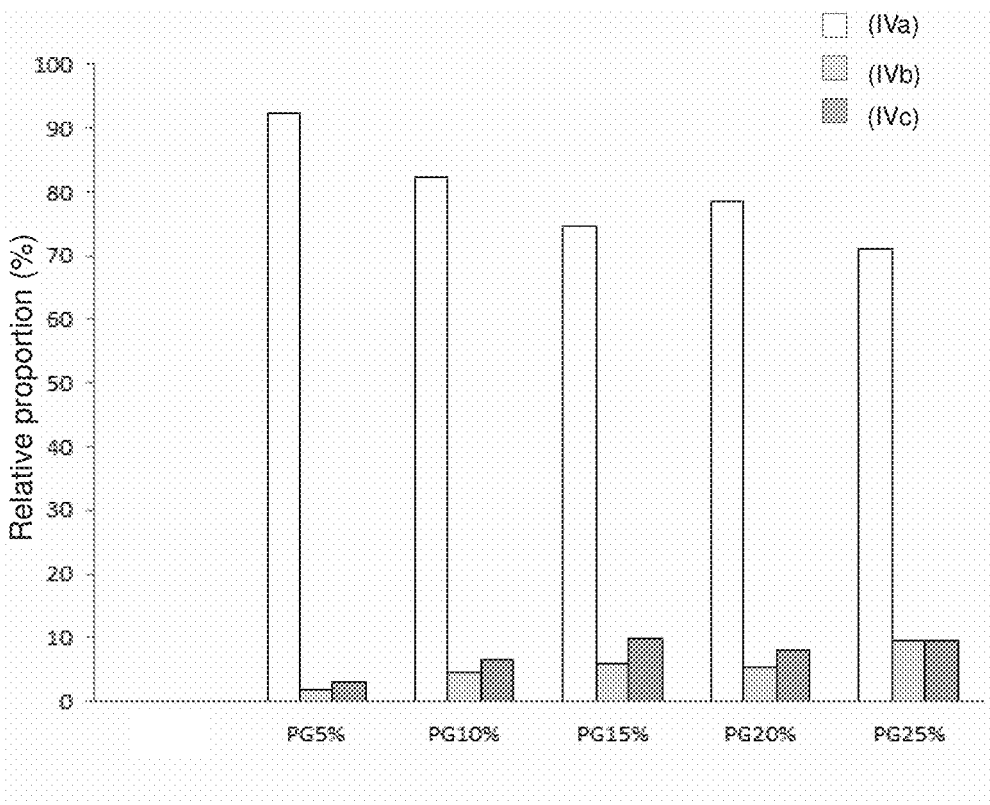

The obtained results are shown in FIG. 9, for the polymers obtained at the pressure of 400 mbar. It is observed that for all of the polymers obtained from glycerol, the proportion of fragments derived from glycerol in which all hydroxyl functions are esterified is largely in the majority.

Analysis of the Glass-Transition Temperature of the Polymers

The glass-transition temperature of the polymers formed is measured by the technique of differential scanning calorimetry (DSC).

To this end, a DSC-Q100 calorimeter is used. Samples of about 10 mg are placed in airtight aluminium capsules. These capsules are cooled down to −50° C., then heated up to 80° C. with a temperature rise ramp of 3° C./min.

Figure 10:
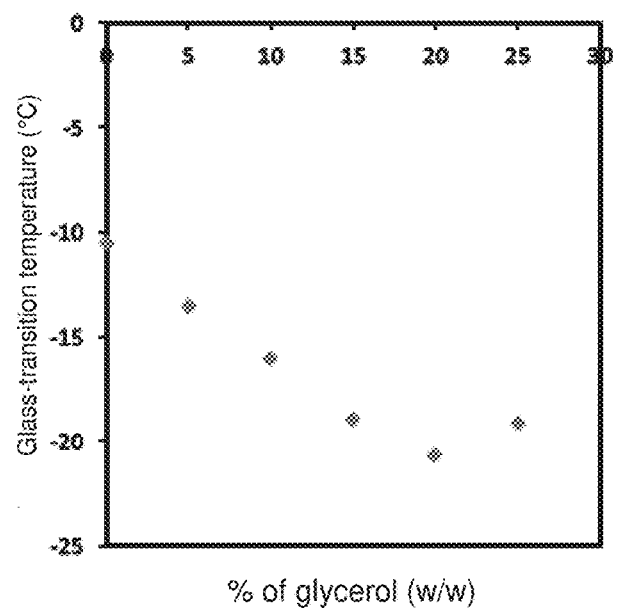
FIG. 10 represents a graph showing the glass-transition temperatures, measured by DSC, of polymers prepared by methods in accordance with the invention, from glycerol and from an oily composition extracted from tomato cutin, as a function of the initial weight content of glycerol in the reaction medium, a pressure of 400 mbar having been applied during the initial phase of the heating step.

The obtained results, expressed in terms of glass-transition temperature thus measured as a function of the initial weight content of glycerol in the reaction medium, are shown in FIG. 10, for the polymers obtained at 400 mbar. It can be seen that the glass-transition temperature of the polymers according to the invention is comprised between −12.5° C. and −25° C., while for the polymer formed without glycerol, it is substantially equal to −10° C.

Similar results are obtained for the other tested pressure values comprised between 0 and 900 mbar.

Analysis of the Mechanical Relaxation Temperature of the Polymers

The mechanical relaxation temperature of the polymers formed is determined by dynamic mechanical analysis (DMA), using a Rheometric Scientific MK3E device also allowing measuring the storage modulus at the rubbery plateau. 1 mm thick, 15 mm high, 4 mm wide samples of each polymer have been analysed from −50° C. to 80° C., with a temperature rise rate of 3° C./min, with an oscillation frequency of 1 Hz, a strain of 0.1% and a preload of 0.5 N.

Figure 11:
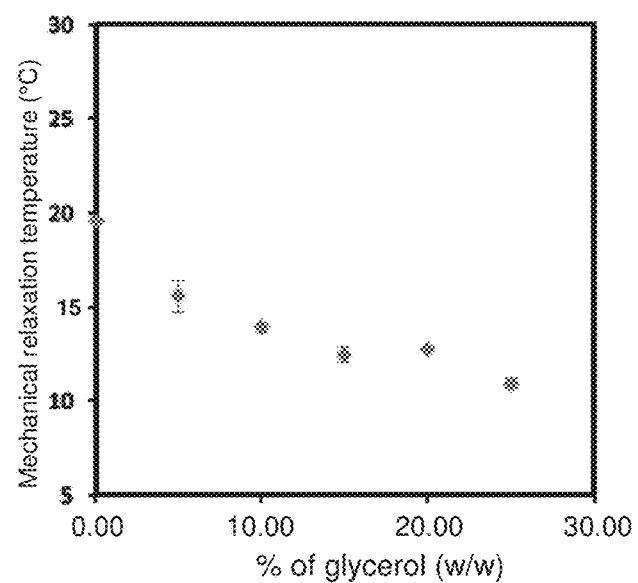
FIG. 11 represents a graph showing the mechanical relaxation temperatures, measured by DMA, of polymers prepared by methods in accordance with the invention, from glycerol and from an oily composition extracted from tomato cutin, as a function of the initial weight content of glycerol in the reaction medium, a pressure of 400 mbar having been applied during the initial phase of the heating step.

The obtained results, expressed in terms of mechanical relaxation temperature thus measured as a function of the initial weight content of glycerol in the reaction medium, are shown in FIG. 11, for the polymers obtained at 400 mbar.

Similar results are obtained for the other tested pressure values comprised between 0 and 900 mbar.

Analysis of the Mechanical Properties of the Polymers

Figure 12:
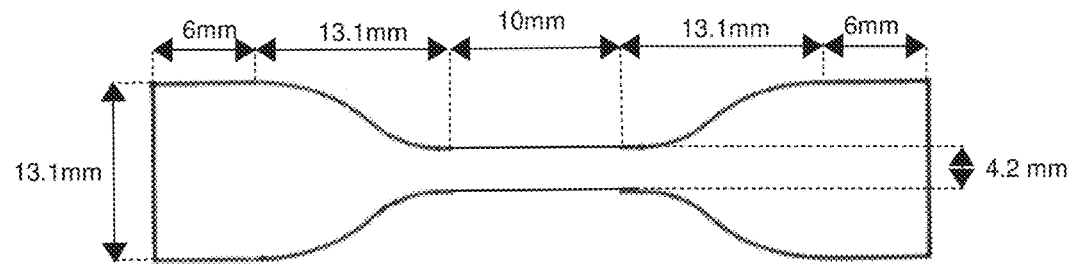
FIG. 12 shows the shape and the dimensions of the test specimens used for the tensile tests intended to determine the mechanical properties of polymers according to the invention.

The obtained polymers are subjected to a tensile test on an MTS Criterion@tensile bench, controlled by the TestWorks® 4 software. To this end, test specimens with the shape and dimensions shown in FIG. 12, and with a thickness of 1 mm are made. The displacement is defined at 10 mm·min$^{-1}$. The test is performed at room temperature.

Figure 13:
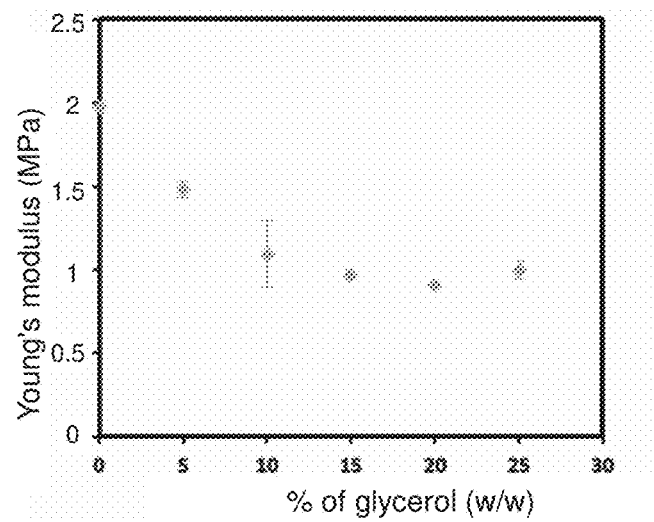
FIG. 13 shows the Young's modulus measured for test specimens formed from polymers according to the invention as a function of the initial weight content of glycerol in the reaction medium, a pressure of 400 mbar having been applied during the initial phase of the heating step.

FIG. 13 shows the Young's modulus measured as a function of the initial weight content of glycerol in the reaction medium, for the polymers obtained at 400 mbar. These results show that for all of the polymers in accordance with the invention, prepared from glycerol, the Young's modulus is lower than that measured for the comparative polymer prepared without using glycerol.

Figure 14:
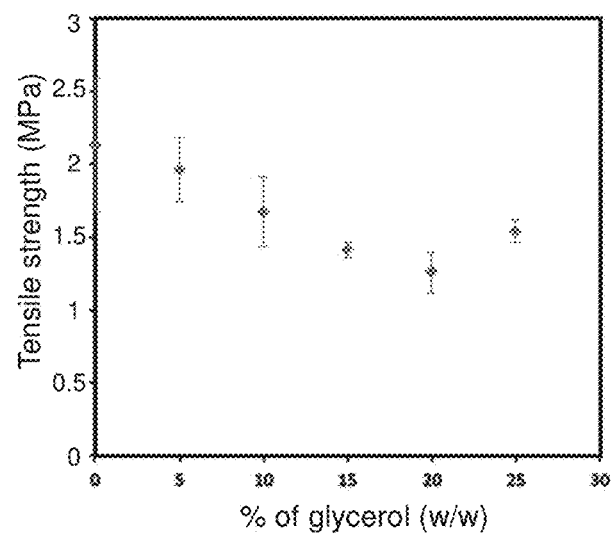
FIG. 14 shows the maximum tensile strength measured for test specimens formed from polymers according to the invention as a function of the initial weight content of glycerol in the reaction medium, a pressure of 400 mbar having been applied during the initial phase of the heating step.

FIG. 14 shows the maximum tensile strength measured as a function of the initial weight content of glycerol in the reaction medium, for the polymers obtained at 400 mbar. These results show that for all of the polymers in accordance with the invention, prepared from glycerol, the maximum tensile strength is lower than that measured for the comparative polymer prepared without implementing glycerol.

Figure 15:
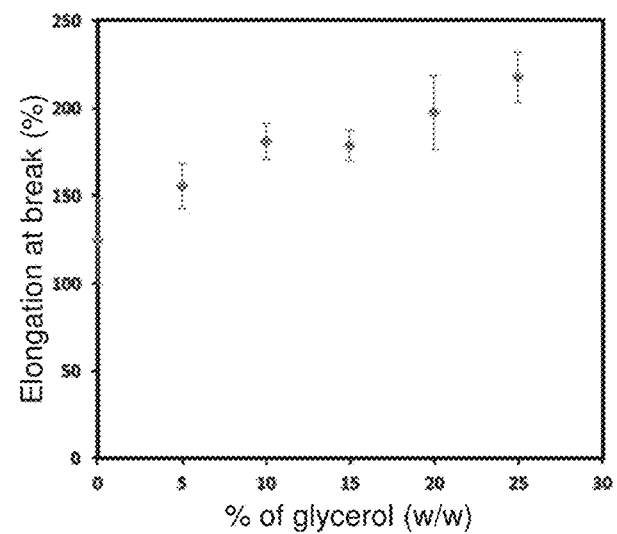
FIG. 15 shows the percentage of elongation at break measured for test specimens formed from polymers according to the invention as a function of the initial weight content of glycerol in the reaction medium, a pressure of 400 mbar having been applied during the initial phase of the heating step.

FIG. 15 shows the percentage of elongation at break measured as a function of the initial weight content of glycerol in the reaction medium, for the polymers obtained at 400 mbar. These results show that for all of the polymers in accordance with the invention, prepared from glycerol, the % of elongation at break is much higher than that measured for the comparative polymer prepared without implementing glycerol.

All of these results demonstrate a good stretch capacity of the polymers according to the invention.

Similar results are obtained for the other tested pressure values comprised between 0 and 900 mbar.

Solubility Test

A sample of each of the obtained polymers is subjected to a solubility test in the following different solvents: water, methanol, ethanol, isopropanol, chloroform, tetrahydrofuran, dichloromethane, dimethylsulfoxide. To this end, 10 mg of each sample are immersed in 1 ml of solvent, then the whole is stirred for 18 hours at room temperature. The percentage by weight of insoluble matter, with respect to the weight of initial matter, is then determined for each solvent/sample pair.

As an example, the results obtained for the PG5% polymer obtained with the application of a pressure of 400 mbar during the heating step are shown in Table 3 below.

TABLE 3

| Solvent | Percentage by weight of insoluble matter (%) |
| --- | --- |
| Water | 94.5 |
| Methanol | 89.1 |
| Ethanol | 91.1 |
| Isopropanol | 94.1 |
| Chloroform | 91.6 |
| Tetrahydrofuran | 92.4 |
| Dichloromethane | 91 |
| Dimethylsulfoxide | 99.1 |

Similar results are obtained for the other polymers according to the invention.

Crystallinity Analysis

Figure 16:
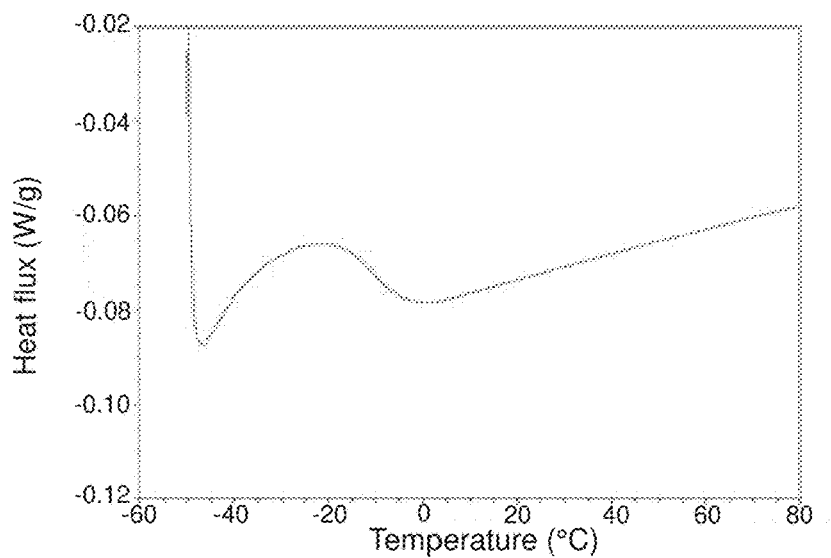
FIG. 16 shows the curve obtained by DSC for a polymer prepared from an oily composition extracted from tomato cutin, a pressure of 400 mbar having been applied during the initial phase of the heating step.
Figure 17:
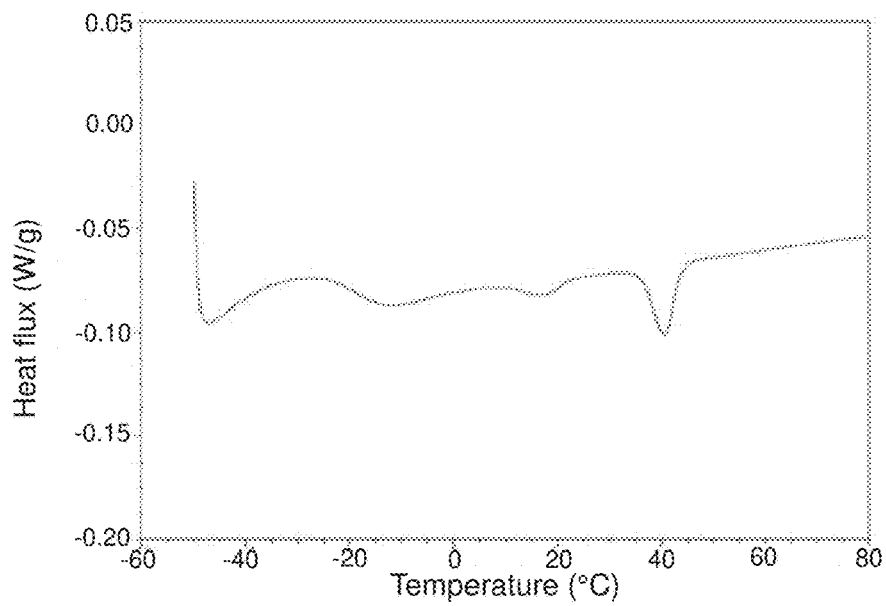
FIG. 17 shows the curve obtained by DSC for a polymer prepared by a method according to the invention from glycerol and from an oily composition extracted from tomato cutin, with an initial weight content of glycerol of 15%, a pressure of 400 mbar having been applied during the initial phase of the heating step.
Figure 18:
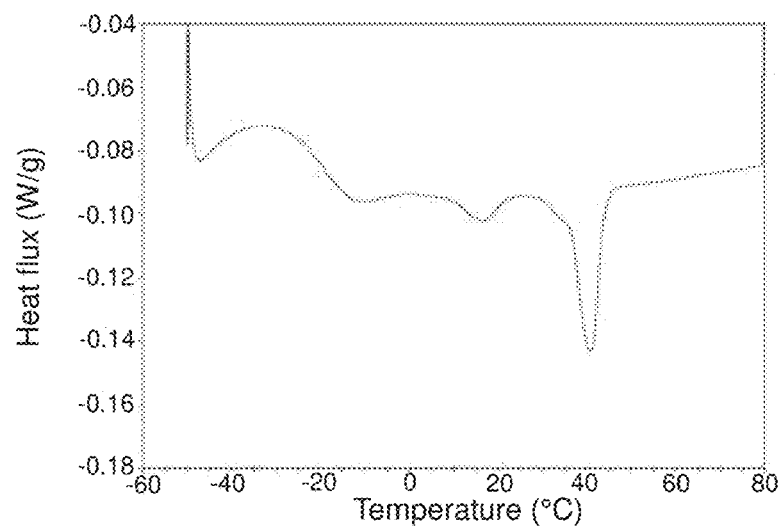
FIG. 18 shows the curve obtained by DSC for a polymer prepared by a method according to the invention from glycerol and from an oily composition extracted from tomato cutin, with an initial weight content of glycerol of 25%, a pressure of 400 mbar having been applied during the initial phase of the heating step.

The polymers obtained by applying a pressure of 400 mbar during the heating step, are analysed by Differential Scanning Calorimetry (DSC) according to the protocol indicated hereinbefore. The results are shown in FIG. 16 for the PG0% polymer, in FIG. 17 for the PG15% polymer and in FIG. 18 for the PG25% polymer. We observe, for the initial weight contents of glycerol higher than or equal to 15% by weight, the presence of a melting peak indicative of a crystalline structure These results are confirmed by X-ray Diffraction (XRD) analysis of these polymers, by means of a Bruker D8 X-ray diffractometer equipped with a Vantec 500 detector. X-ray radiation, Cu K$\alpha$1 (=0.15406 nm), produced in a sealed copper tube at 40 kV and 40 mA, is selected and parallelised using Goebel mirrors. The distance between the sample and the detector is 10 cm and the Bragg angles from 3 to 70 (°2θ).

Figure 19:
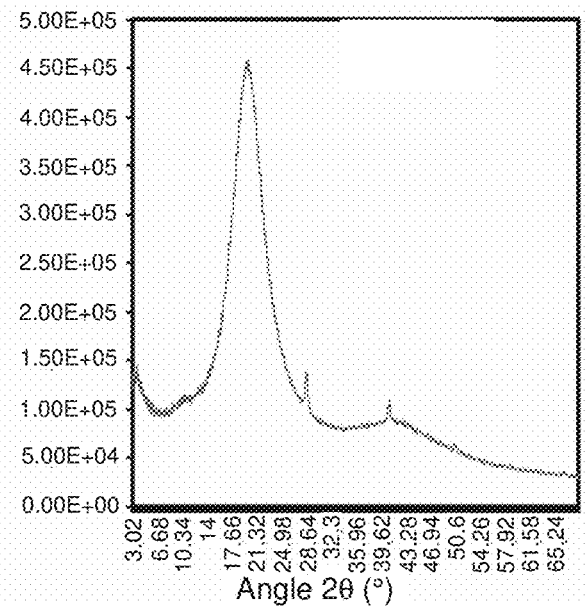
FIG. 19 shows the XRD spectrum of a polymer prepared from an oily composition extracted from tomato cutin, a pressure of 400 mbar having been applied during the initial phase of the heating step.
Figure 20:
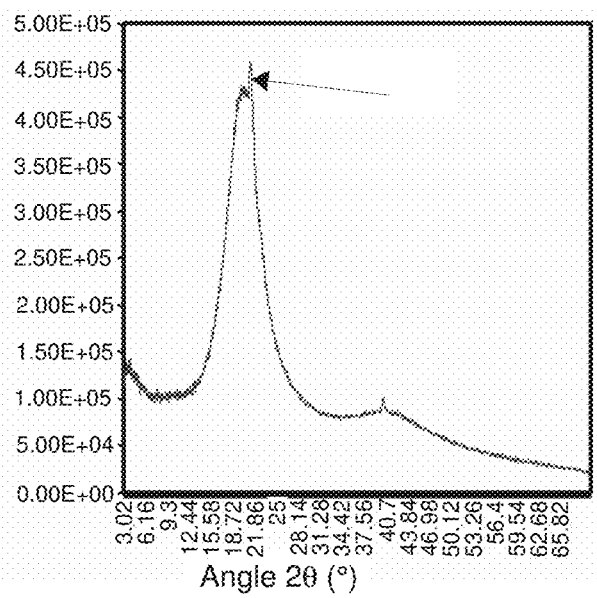
FIG. 20 shows the XRD spectrum of a polymer prepared by a method according to the invention from glycerol and from an oily composition extracted from tomato cutin, with an initial weight content of glycerol of 25%, a pressure of 400 mbar having been applied during the initial phase of the heating step.

The obtained XRD spectra are shown in FIG. 19 for the PG0% polymer and in FIG. 20 for the PG25% polymer. For the PG25% polymer, we observe the appearance of a peak indicating a crystalline zone, indicated by an arrow in the figure.

Similar results are obtained for the other polymers according to the invention obtained from a weight content of glycerol in the reaction medium higher than or equal to 15%.

Figure 21:
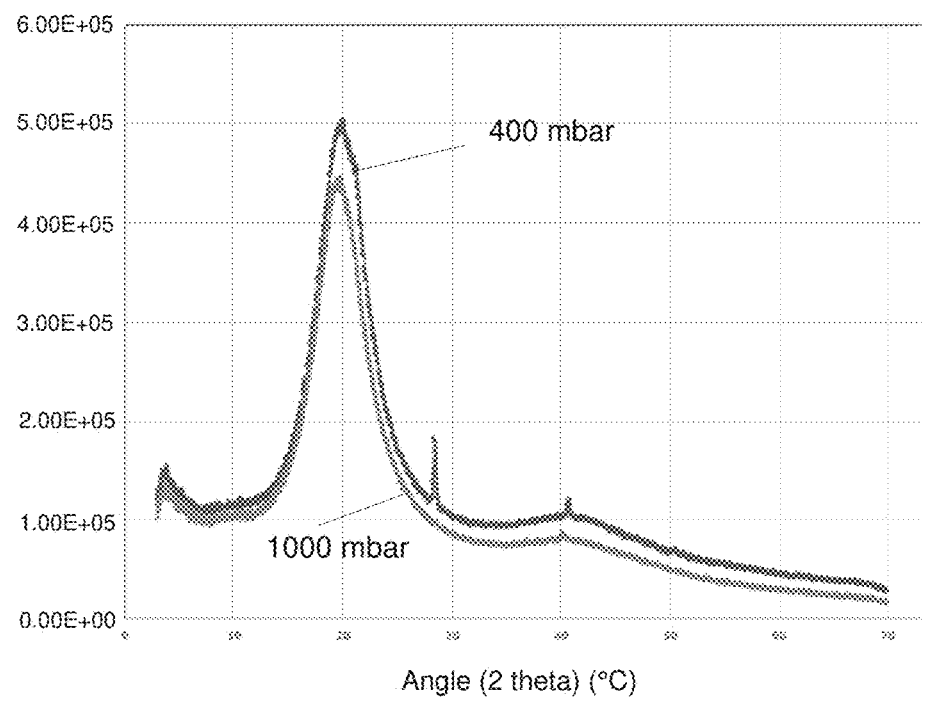
FIG. 21 shows XRD spectra obtained for polymers prepared from an oily composition extracted from tomato cutin and from a weight content of glycerol in the reaction medium of 15%, by applying a pressure of 400 mbar in accordance with the invention, or of 1,000 mbar, during the heating step.

FIG. 21 shows the XRD spectra obtained for polymers prepared from a weight content of glycerol in the reaction medium of 15%, by applying a pressure of 400 mbar or 1,000 mbar during the heating step. It is observed that a semi-crystalline structure is obtained for the pressure value of 400 mbar in accordance with the invention.

Figure 22:
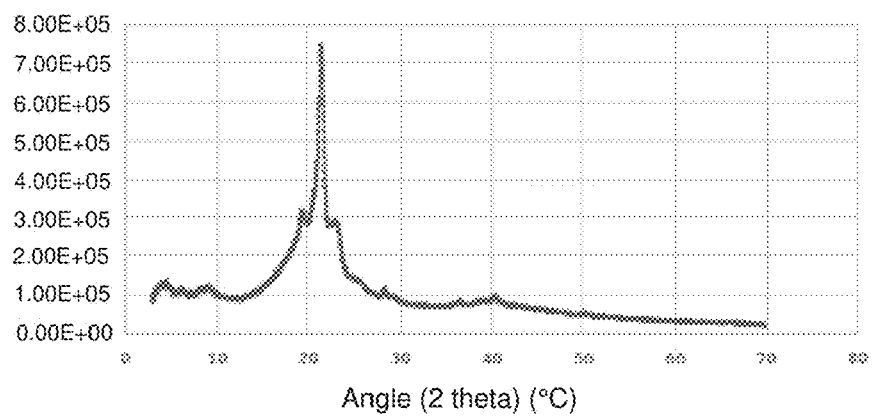
FIG. 22 shows XRD spectra obtained for an oily composition extracted from tomato cutin (in A/) and for the polymer obtained in accordance with the invention from this oily composition and from glycerol at a weight content of 20%, a pressure of 400 mbar having been applied during the heating step (in B/).
Figure 22:
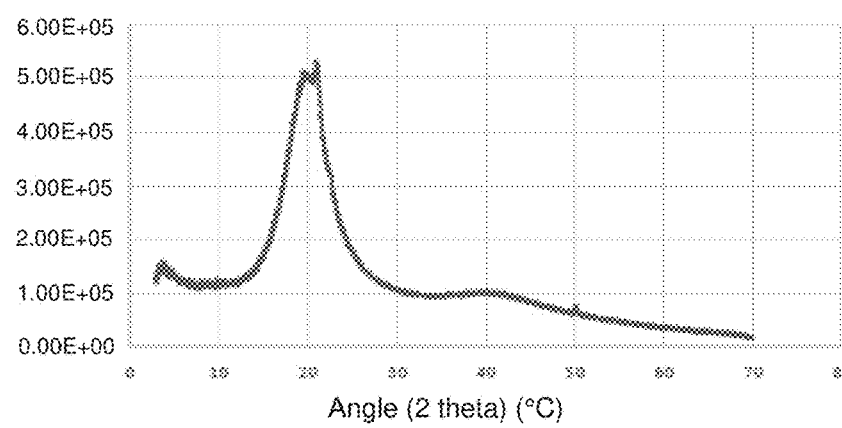

FIG. 22 shows the DRX spectra obtained for the initial tomato cutin extract (in A/) and for the polymer obtained from this extract and from glycerol at a weight content of 20%, a pressure of 400 mbar having been applied during the heating step (in B/). It is clearly observed that the crystalline organisation of the polymer prepared in accordance with the invention is different from that of the initial extract. The peaks indicating a beta crystallisation, observed on the spectrum of the oily composition, have disappeared in favour of a peak indicating a crystallisation in the hexagonal phase, at 4.2 Å, on the polymer spectrum.

Analysis of the Storage Modulus on the Rubbery Plateau and of the Apparent Crosslinking Density As previously indicated, the storage modulus is measured by dynamic mechanical analysis (DMA), by means of a Rheometric Scientific MK3E device.

At a temperature of 50° C., the materials behave like rubber with a storage modulus in the range of mega-pascal. The application of Flory's theory on rubber elasticity then allows estimating ν the apparent crosslinking density of the elastomer network, according to the equation:

$$\nu = E'/3RT$$

where R is the gas constant (8.32 J·mol$^{-1}$·K$^{-1}$), T is the temperature in Kelvin and E' is the storage modulus on the rubbery plateau measured at 50° C. (323 K).

The results obtained, for a pressure of 400 mbar, are shown in FIG. 23 as a function of the initial weight content of glycerol. It is observed that the storage modulus E measured at 50° C., on the amorphous rubbery plateau, decreases when the initial glycerol content in the reaction medium increases, then becomes constant for glycerol contents higher than or equal to 15% by weight. The same is true for the apparent crosslinking density, which according to Flory's theory is directly proportional to the elasticity modulus.

These results prove that the method according to the invention allows producing polymers with a controlled molecular structure and with an amorphous or semi-crystalline nature, depending on the weight content of glycerol in the initial reaction medium.

The ratio of the storage modulus measured for different pressure values applied during the heating step of the method, to the storage modulus measured when the method is carried out at atmospheric pressure (E'/Eatm ratio) is shown in FIG. 24, for the polymers obtained from an initial glycerol content of 15% by weight. This ratio is substantially constant in the pressure range of 400 to 800 mbar, which indicates a stable structure of the polymers obtained in accordance with the invention in this range.

Determination of the Melting Temperature

The melting temperatures are measured by differential enthalpy analysis (DEA or Differential Scanning Calorimetry (DSC)), comprising a temperature scanning of a polymer sample, from a temperature of −50° C. to a temperature of 80° C. with a temperature rise ramp of 3° C./min. This analysis is carried out on an amount of polymer of 10 mg, placed in a hermetic aluminium capsule.

All of the results obtained, as an example for the polymers formed in accordance with the invention for a pressure of 400 mbar applied during the heating step, are reported in Tables 4 and 5 below.

TABLE 4

Chemical and DSC characterisations of polymers obtained according to the invention, a pressure of 400 mbar having been applied during heating

| | Chemical characterisation | | DSC analysis | | |
|---|---|---|---|---|---|
| Polymer | % by weight of glycerol | % by weight of crosslinked glycerol | Glass-transition temperature (° C.) | Melting temperature 1 (° C.) | Melting temperature 2 (° C.) |
| PG5% | 2.27 | 2.17 | −13.1 | — | — |
| PG10% | 3.93 | 3.75 | −15.7 | — | 39.7 |
| PG15% | 4.8 | 4.57 | −17.0 | 17.9 | 41.6 |
| PG20% | 5.2 | 4.87 | −20.4 | 16.8 | 41.2 |
| PG25% | 6.18 | 5.89 | −18.5 | 18.3 | 41.6 |

TABLE 5

Characterisations by DMA and by mechanical testing of polymers obtained according to the invention, a pressure of 400 mbar having been applied during heating

| | DMA analysis | | Mechanical test | | |
|---|---|---|---|---|---|
| Polymer | Mechanical relaxation temperature (° C.) | Storage modulus at 50° C. (MPa) | Tensile strength (%) | Elongation at break (%) | Young's modulus (MPa) |
| PG5% | 5.4 | 5.035 | 2.0 | 155 | 1.74 |
| PG10% | 3.2 | 4.058 | 1.7 | 180.7 | 1.26 |
| PG15% | 1.9 | 1.408 | 1.4 | 178.4 | 1.11 |
| PG20% | 0.9 | 1.521 | 1.3 | 197.3 | 1.10 |
| PG25% | 0.2 | 1.589 | 1.5 | 217.6 | 1.19 |

All of these results are particularly satisfactory, quite particularly for the PG 15%, PG20% and PG25% polymers.

EXPERIMENT 2—APPLE CUTIN

From industrial pomace derived from the transformation of apples, the hydroxylated fatty acids of apple cutin have been extracted under the same conditions as described in Experiment 1 for tomato.

After rinsing(s) of the pellet obtained with demineralised water and lyophilisation, an oily composition is obtained, with a yield comprised between 20 and 25%, this oily composition containing essentially hydroxylated fatty acids, and more particularly, the percentages being expressed by weight with respect to the total weight of the oily composition: 44% of di-hydroxyhexadecanoic acid, 24% of 18-hydroxy-(9,10)epoxy-octadecanoic acid, 10% of 18-hydroxy-octadecenoic acid, 7% of trihydroxyoctadecanoic acid, 5% of 16-hydroxyhexadecanoic acid, 6% of palmitic acid, 2% of hexadecanedioic acid, 1% of 22-hydroxy-docosanoic acid, 1% of coumaric acid.

A polymer is prepared based on this oily composition and glycerol, under the conditions described in Experiment 1, with a heating temperature of 150° C., a reduced pressure of 400 mbar and a content of 10% (w/w) glycerol.

The formation of polyester is confirmed by analysis by Fourier-transform infrared spectroscopy, carried out as described in Experiment 1: as shown in FIG. 25, we observe on the infrared spectrum, for the obtained polymer ("PPG10%"), the apparition of a band characteristic of an ester group and the shift of the band characteristic of the carbonyl group, with respect to the initial oily composition ("CHP").

The invention claimed is:

1. A method for preparing a polymer based on a polyhydroxylated fatty acid, comprising, successively, steps of:
    preparation of a reaction medium by bringing together:
        a monomer consisting of a dihydroxylated fatty acid or an ester of a dihydroxylated fatty acid and of an alcohol with a linear or branched, saturated or unsaturated, optionally substituted, aliphatic chain, said aliphatic chain including from 1 to 18 carbon atoms, and
        glycerol, in an amount of 15 to 25% by weight with respect to the total weight of said reaction medium,
        the reaction medium having a molar ratio of glycerol to the monomer between 0.16 and 1.04 and wherein the glycerol and the monomer represent at least 90% by weight of the reaction medium,
        said reaction medium being free of catalyst,
    and heating of said reaction medium at 120 to 200° C. to carry out the copolymerisation of said monomer and of said glycerol and the crosslinking of the polymer thus formed, at least an initial phase of the heating step being carried out at a pressure comprised between 400 and 800 mbar, wherein the duration of the initial phase is comprised between 30 minutes and 5 hours.

2. The method according to claim 1, wherein said monomer is a methyl or ethyl ester of the dihydroxylated fatty acid.

3. The method according to claim 1, wherein said monomer is obtained by depolymerising cutin.

4. The method according to claim 1, wherein the preparation of said reaction medium comprises mixing said glycerol with a composition resulting from the depolymerisation of cutin.

5. The method according to claim 1, wherein said heating step is carried out for a period of at least 4 hours.

6. The method according to claim 1, comprising, during said heating step, before a gel point of said polymer has been reached, a step of eliminating bubbles present in said reaction medium.

7. The method according to claim 1, wherein the preparation of the reaction medium is carried out at a temperature higher than or equal to 50° C.

8. The method according to claim 3, wherein said monomer is obtained by depolymerising tomato cutin.

9. The method of claim 1, wherein the duration of the initial phase is about 90 minutes.

10. The method of claim 1, wherein the monomer is 10,16-dihydroxyhexadecanoic acid or its methyl or ethyl ester.

\* \* \* \* \*